(12) United States Patent
Choi et al.

(10) Patent No.: US 11,401,580 B2
(45) Date of Patent: *Aug. 2, 2022

(54) METHOD FOR PRE-TREATMENT OF GOLD-BEARING OXIDE ORES

(71) Applicant: Barrick Gold Corporation, Toronto (CA)

(72) Inventors: Yeonuk Choi, Oakville (CA); Ahmad Ghahremaninezhad Gharelar, Kingston (CA)

(73) Assignee: Barrick Gold Corporation, Toronto (CA)

( * ) Notice: Subject to any disclaimer, the term of this patent is extended or adjusted under 35 U.S.C. 154(b) by 19 days.

This patent is subject to a terminal disclaimer.

(21) Appl. No.: 16/776,332

(22) Filed: Jan. 29, 2020

(65) Prior Publication Data

US 2020/0165702 A1    May 28, 2020

Related U.S. Application Data

(63) Continuation of application No. 15/729,961, filed on Oct. 11, 2017, now Pat. No. 10,597,752, which is a
(Continued)

(51) Int. Cl.
*C22B 11/00* (2006.01)
*C22B 3/04* (2006.01)
(Continued)

(52) U.S. Cl.
CPC .......... *C22B 11/04* (2013.01); *C22B 1/00* (2013.01); *C22B 3/04* (2013.01); *C22B 3/08* (2013.01); *Y02P 10/20* (2015.11)

(58) Field of Classification Search
None
See application file for complete search history.

(56) References Cited

U.S. PATENT DOCUMENTS

| 496,951 A | 5/1893 | Parkes |
| 1,627,582 A | 5/1927 | Terry |
| (Continued) | | |

FOREIGN PATENT DOCUMENTS

| AU | 4576985 | 6/1986 |
| AU | 574818 | 7/1988 |
| (Continued) | | |

OTHER PUBLICATIONS

Sitando, "Gold Leaching in Thiosulfate-Oxygen Solutions," Thesis presented for the degree of Doctor of Philosophy in Extractive Metallurgy, Murdoch University, Perth, published 2017, 344 pages.
(Continued)

*Primary Examiner* — Scott R Kastler
(74) *Attorney, Agent, or Firm* — Sheridan Ross P.C.

(57) ABSTRACT

The disclosure relates to pre-treatment of precious metal-bearing oxide ores, prior to precious metal leaching by thiosulfate. The process comprises mixing oxide ore in oxygenated water in the presence of a carbon-based material (e.g., activated carbon or other type of carbon). The carbon-based material can be separated from the ore slurry, and, the gold is thereafter leached by a thiosulfate lixiviant.

20 Claims, 1 Drawing Sheet

Related U.S. Application Data continuation of application No. 14/287,889, filed on May 27, 2014, now Pat. No. 10,161,016.

(60) Provisional application No. 61/828,558, filed on May 29, 2013.

(51) Int. Cl.
  *C22B 1/00* (2006.01)
  *C22B 3/08* (2006.01)

(56) References Cited

U.S. PATENT DOCUMENTS

| | | | |
|---|---|---|---|
| 3,317,313 A | 5/1967 | Biiggs |
| 3,454,503 A | 7/1969 | Blankenhorn |
| 3,524,724 A | 8/1970 | Every et al. |
| 3,833,351 A | 9/1974 | Neskora et al. |
| 3,843,771 A | 10/1974 | Urban |
| 3,902,896 A | 9/1975 | Borbely et al. |
| 3,979,207 A | 9/1976 | MacGregor |
| 4,070,182 A | 1/1978 | Genik-Sas-Berezowsky et al. |
| 4,155,810 A | 5/1979 | Kitajima et al. |
| 4,256,706 A | 3/1981 | Heinen et al. |
| 4,269,622 A | 5/1981 | Kerley, Jr. |
| 4,289,532 A | 9/1981 | Matson et al. |
| 4,296,075 A | 10/1981 | Yan |
| 4,304,644 A | 12/1981 | Victorovich et al. |
| 4,369,061 A | 1/1983 | Kerley, Jr. |
| 4,384,889 A | 5/1983 | Wiewiorowski et al. |
| 4,411,612 A | 10/1983 | Holland |
| 4,411,873 A | 10/1983 | Yan |
| 4,489,984 A | 12/1984 | Savins |
| 4,510,027 A | 4/1985 | Wiewiorowski et al. |
| 4,528,166 A | 7/1985 | McDougall |
| 4,552,589 A | 11/1985 | Mason et al. |
| 4,571,264 A | 2/1986 | Weir et al. |
| 4,585,561 A | 4/1986 | Zlokarnik et al. |
| 4,605,439 A | 8/1986 | Weir |
| 4,632,701 A | 12/1986 | Genik-Sas-Berezowsky et al. |
| 4,634,187 A | 1/1987 | Huff et al. |
| 4,654,078 A | 3/1987 | Perez et al. |
| 4,654,079 A | 3/1987 | Nunez et al. |
| 4,684,404 A | 8/1987 | Kalocsai |
| 4,721,526 A | 1/1988 | Elmore et al. |
| 4,723,998 A | 2/1988 | O'Neil |
| 4,738,718 A | 4/1988 | Bakshani et al. |
| 4,740,243 A | 4/1988 | Krebs-Yuill et al. |
| 4,758,413 A | 7/1988 | Harris et al. |
| 4,765,827 A | 8/1988 | Clough et al. |
| 4,778,519 A | 10/1988 | Pesic |
| 4,801,329 A | 1/1989 | Clough et al. |
| 4,816,234 A | 3/1989 | Brison et al. |
| 4,816,235 A | 3/1989 | Pesic |
| 4,902,345 A | 2/1990 | Ball et al. |
| 4,913,730 A | 4/1990 | Deschenes et al. |
| 4,923,510 A | 5/1990 | Ramadorai et al. |
| 4,925,485 A | 5/1990 | Schulze |
| 4,980,134 A | 12/1990 | Butler |
| 5,051,128 A | 9/1991 | Kubo |
| 5,071,477 A | 12/1991 | Thomas et al. |
| 5,114,687 A | 5/1992 | Han et al. |
| 5,127,942 A | 7/1992 | Brierley et al. |
| 5,147,617 A | 9/1992 | Touro et al. |
| 5,147,618 A | 9/1992 | Touro et al. |
| 5,215,575 A | 6/1993 | Butler |
| 5,232,490 A | 8/1993 | Bender et al. |
| 5,236,492 A | 8/1993 | Shaw et al. |
| 5,244,493 A | 9/1993 | Brierley et al. |
| 5,246,486 A | 9/1993 | Brierley et al. |
| 5,308,381 A | 5/1994 | Han et al. |
| 5,338,338 A | 8/1994 | Kohr |
| 5,340,380 A | 8/1994 | Virnig |
| 5,344,479 A | 9/1994 | Kerfoot et al. |
| 5,354,359 A | 10/1994 | Wan et al. |
| 5,364,453 A | 11/1994 | Kohr |
| 5,385,668 A | 1/1995 | Greenhalgh et al. |
| 5,405,430 A | 4/1995 | Groves et al. |
| 5,443,621 A | 8/1995 | Kohr |
| 5,484,470 A | 1/1996 | Kristjansdottir et al. |
| 5,489,326 A | 2/1996 | Thomas et al. |
| 5,536,297 A | 7/1996 | Marchbank et al. |
| 5,536,480 A | 7/1996 | Simmons |
| 5,601,630 A | 2/1997 | Hoecker |
| 5,607,619 A | 3/1997 | Dadgar et al. |
| 5,626,647 A | 5/1997 | Kohr |
| 5,653,945 A | 8/1997 | Gathje et al. |
| 5,672,194 A | 9/1997 | Hunter et al. |
| 5,683,490 A | 11/1997 | Earley, III et al. |
| 5,733,431 A | 3/1998 | Green et al. |
| 5,785,736 A | 7/1998 | Thomas et al. |
| 5,837,210 A | 11/1998 | Simmons |
| 5,876,588 A | 3/1999 | Lalancette et al. |
| 5,939,034 A | 8/1999 | Virnig et al. |
| 5,961,833 A | 10/1999 | Green et al. |
| 6,156,186 A | 12/2000 | Mueller et al. |
| 6,165,344 A | 12/2000 | Green et al. |
| 6,180,072 B1 | 1/2001 | Veal et al. |
| 6,183,706 B1 | 2/2001 | King |
| 6,197,214 B1 | 3/2001 | Virnig et al. |
| 6,248,301 B1 | 6/2001 | Hannaford et al. |
| 6,251,163 B1 | 6/2001 | King |
| 6,344,068 B1 | 2/2002 | Fleming et al. |
| 6,350,420 B1 | 2/2002 | Duyvesteyn et al. |
| 6,355,175 B1 | 3/2002 | Green et al. |
| 6,368,381 B1 | 4/2002 | King et al. |
| 6,451,275 B1 | 9/2002 | Fleming |
| 6,500,231 B1 | 12/2002 | Wan |
| 6,602,319 B1 | 8/2003 | Murthy et al. |
| 6,632,264 B2 | 10/2003 | Zhang et al. |
| 6,641,642 B2 | 11/2003 | Simmons et al. |
| 6,660,059 B2 | 12/2003 | Ji et al. |
| 7,066,983 B2 | 6/2006 | Ji et al. |
| 7,544,232 B2 | 6/2009 | Hackl et al. |
| 7,559,974 B2 | 7/2009 | Ji et al. |
| 7,572,317 B2 | 8/2009 | Choi et al. |
| 7,704,298 B2 | 4/2010 | Ji et al. |
| 7,722,840 B2 | 5/2010 | Hackl et al. |
| 7,985,277 B2 | 7/2011 | Xia et al. |
| 8,097,227 B2 | 1/2012 | Ji et al. |
| 8,273,237 B2 | 9/2012 | Marsden et al. |
| 8,597,399 B2 | 12/2013 | Ji et al. |
| 8,715,389 B2 | 5/2014 | Choi et al. |
| 8,821,613 B2 | 9/2014 | Ji et al. |
| 9,051,625 B2 | 6/2015 | Choi et al. |
| 9,790,572 B2 | 10/2017 | Choi et al. |
| 10,161,016 B2 * | 12/2018 | Choi ........................ C22B 3/04 |
| 10,415,116 B2 | 9/2019 | Choi et al. |
| 10,597,752 B2 | 3/2020 | Choi et al. |
| 2003/0154822 A1 | 8/2003 | Hall et al. |
| 2004/0258588 A1 | 12/2004 | Buseth et al. |
| 2005/0066774 A1 | 3/2005 | Asano et al. |
| 2007/0056909 A1 | 3/2007 | Zontov |
| 2008/0105088 A1 | 5/2008 | Ji et al. |
| 2009/0056500 A1 | 3/2009 | Mendes |
| 2009/0071296 A1 | 3/2009 | Hillier et al. |
| 2010/0058893 A1 | 3/2010 | Zontov |
| 2011/0011216 A1 | 1/2011 | Jeffrey |
| 2011/0030508 A1 | 2/2011 | Dreisinger et al. |
| 2012/0304828 A1 | 12/2012 | Sano et al. |
| 2013/0091990 A1 * | 4/2013 | Choi ...................... C22B 11/04 75/744 |
| 2014/0047954 A1 | 2/2014 | Ji et al. |
| 2020/0232065 A1 * | 7/2020 | Olvera Olmedo ........ C22B 3/42 |

FOREIGN PATENT DOCUMENTS

| | | |
|---|---|---|
| AU | 1852599 | 9/1999 |
| AU | 752203 | 9/2002 |
| AU | 760740 | 5/2003 |
| AU | 783904 | 12/2005 |
| CA | 2209559 | 1/1998 |
| CA | 2315480 | 2/2001 |
| CA | 2412352 | 5/2004 |
| CA | 2449467 | 5/2004 |

(56) References Cited

FOREIGN PATENT DOCUMENTS

| | | |
|---|---:|---|
| CA | 2698578 | 7/2014 |
| CL | 38972 | 9/1995 |
| CL | 45360 | 6/2009 |
| CL | 52952 | 8/2016 |
| EP | 316094 | 5/1989 |
| EP | 522978 | 1/1993 |
| EP | 1433860 | 6/2004 |
| EP | 2821513 | 1/2015 |
| EP | 3004407 | 4/2016 |
| GB | 1378052 | 12/1974 |
| GB | 1423342 | 2/1976 |
| GB | 2180829 | 4/1987 |
| GB | 2310424 | 8/1997 |
| JP | S50-155422 | 12/1975 |
| JP | S53-59254 | 5/1978 |
| JP | 60208434 | 10/1985 |
| JP | 61127833 | 6/1986 |
| JP | 61127834 | 6/1986 |
| JP | 2004-018939 | 1/2004 |
| JP | 2012-214865 | 11/2012 |
| JP | 2014-516019 | 7/2014 |
| RO | 81261 | 2/1983 |
| RU | 2268316 | 1/2006 |
| SU | 1279954 | 12/1986 |
| SU | 1284942 | 1/1987 |
| WO | WO 90/15887 | 12/1990 |
| WO | WO 91/11539 | 8/1991 |
| WO | WO 94/06944 | 3/1994 |
| WO | WO 95/04164 | 2/1995 |
| WO | WO 97/49474 | 12/1997 |
| WO | WO 99/13116 | 3/1999 |
| WO | WO 01/23626 | 4/2001 |
| WO | WO 01/36333 | 5/2001 |
| WO | WO 01/42519 | 6/2001 |
| WO | WO 01/88212 | 11/2001 |
| WO | WO 02/27045 | 4/2002 |
| WO | WO 03/060172 | 7/2003 |
| WO | WO 2003/080879 | 10/2003 |
| WO | WO 2004/005556 | 1/2004 |
| WO | WO 2005/017215 | 2/2005 |
| WO | WO 2013/129017 | 7/2015 |
| ZA | 770840 | 1/1978 |

OTHER PUBLICATIONS

Xu et al, "Review of Thiosulfate Leaching of Gold: Focus on Thiosulfate Consumption and Gold Recovery from Pregnant Solution," Metals, Jun. 15, 2017, vol. 7, 222, 16 pages.

Notice of Allowance (no translation) for Chilean Patent Application No. 201503410, dated Mar. 11, 2021, 3 pages.

Official Action (with English translation) for Japanese Patent Application No. 2019-079274, dated Mar. 23, 2021, 7 pages.

Notice of Allowance (no translation) for Mexican Patent Application No. MX/a/2015/015980, dated Feb. 16, 2021 2 pages.

Third Party Observation for International (PCT) Patent Application No. PCT/IB2020/000795, dated Apr. 30, 2021 7 pages.

Official Action (no translation) for Mexican Patent Application No. MX/a/2015/015980, dated Jul. 21, 2020 3 pages.

Notice to Grant (no translation) for Peruvian Patent Application No. 2440-2015, dated Aug. 27, 2020, 4 pages.

U.S. Appl. No. 16/748,523, filed Jan. 21, 2020, Olmedo et al.

Abbruzzese et al., "Nuove Prospettive Per II Recupero Dell'oro Dai Mineralia: La Lisciviazione Con Tiosolfata"; l'industria mineraria, No. 4, 1994; pp. 10-14.

Abbruzzese et al., "Thiosulphate Leaching for Gold Hydrometallurgy", Hydrometallurgy 39, 1995, pp. 265-276.

Ablimt et al., "Study on Intensified Leaching of Gold with Thiosulfate", Zingjiang Res Inst of Chemistry, PRC, vol. 20 (1), 1999, pp. 39-41.

Adams, "The chemical behaviour of cyanide in the extraction of gold. 2. Mechanisms of cyanide loss in the carbon-in-pulp process," J. South African Inst. Mining & Metallurgy, 1990, vol. 90(3), pp. 67-73.

Adams et al., "Characterization and Blinding of Carbonaceous Preg-Robbers in Gold Ores", Minerals Engineering, Pregamon Press, Oxford, Great Britain, vol. 11 No. 10, Oct. 1998, pp. 919-927.

Agadzhanyan et al., "Kinetics of Ion Exchange in Selective Systems. II. Kinetics of the Exchange of Differently charged Ions in a Macroporous ion Exchanger", Published in the Russian Journal of Physical Chemistry, 61(7), 1987, pp. 994-997.

Anderson, et al., "Leaching of Antimony From a Refractory Precious Metals Concentrate," Hydrometallurgy: Fundamentals, technology and innovations, Society for Mining, Metallurgy and Exploration, 1993, pp. 341-363.

Anzhang, Mao et al., "One-Step Leaching of Some Refractory Gold Concentrate Containing Arsenic and Theory Analysis," J. Cent. South Univ. Technol., vol. 4, No. 2 (Nov. 1997).

Atluri et al., "Recovery of Gold and Silver from Ammoniacal Thiosulfate Solutions Containing Copper by Resin ion Exchange Method" A Thesis Submitted to the Faculty of the Department of Materials Science and Engineering at the University of Arizona, 1987, 219 pages.

Atluri et al., "Recovery of Silver from Ammoniacal Thiosulfate Solutions", Published in Proceedings of a Symposium on Precious and Rare Metals held in Albuquerque, NM, Apr. 6-8, 1988, pp. 290-305.

Awadalla et al., "Recovery of Gold from Thiourea, Thiocyanate, or Thiosulfate Solutions by Reduction-Precipitation with a Stabilized Form of Sodium Borohydride", published in Separation Science and Technology, 26(9), 1991, pp. 1207-1228.

Aylmore et al., "Thermodynamic Analysis of Gold Leaching by Ammoniacal Thiosulfate Using Eh/pH Speciation Diagrams", Minerals & Metallurgical Processing, vol. 16, No. 4, Nov. 2001, pp. 221-227.

Bagdasaryan, "A Study of Gold and Silver . . . " Izvestiia Vysshikh Uchebnykh Zavedenii Tsvetnaia Metallurgiia, vol. 5, 1983, pp. 64-68.

Balasanian, Ion et al., "Modeling A Process for Sodium Thiosulfate Production from Sulfite and Sulfur, "Revista de Chimie, vol. 26, No. 6 (1975), pp. 475-479.

Bartels, "Chemical Abstract Index Compilation for Thiosalts and Related Compounds", Report dated Nov. 1978, A1-A17, pp. 1-5.

Bartlett, "Metal Extraction from Ores by Heap Leaching"; Metallurgical and Materials Transactions B; vol. 28B, Aug. 1997; pp. 529-545.

Benedetti, Marc and Boulegue, "Mechanism of Gold Transfer and Deposition in a Supergene Environment", Geochimica et Cosmochimica Acta, vol. 55, 1991, pp. 1539-1547.

Bennet et al., "A Comprehensive Copper Stockpile Leach Model: Background and Model Formulation" Hydrometallurgy 2003— Fifth International Conference in Honor of Professor Ian Ritchie— vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 315-328.

Berezowsky et al., "Recovery of Gold and Silver from Oxidation Leach Residues by Ammoniacal Thiosulphate Leaching", Paper presented at the 108.sup.th AIME Annual Meeting, New Orleans, Louisiana, Feb. 18-22, 1979, pp. 1-18.

Bhaduri, "Lixiviation of Refractory Ores with Diethylamine or Ammonium Thiosulfate", A thesis submitted in partial fulfillment of the requirements for the degree of Master of Science in Metallurgical Engineering, Aug. 1987, University of Nevada, Reno, 98 pages.

Bhakta, P., "Ammonium Thiosulfate Heap Leaching" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 259-267.

Bhakta, P., "Measurement and Application of Bioxidation Kinetics for Heaps" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 269-273.

(56) References Cited

OTHER PUBLICATIONS

Bhappu, R B, "Status of Non-Cyanide Heap Leaching and Other Cyanide Substitutes", Session Papers: American Mining Congress, Apr. 24-28, 1988, Chicago, vol. 1, pp. 275-287.
Black et al., "Towards an Understanding of Copper (I) Speciation and Reactivity in the Copper-Ammonia-Thiosulfate Lixiviant System", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 183-194.
Block-Bolten et al., "Gold and Silver Extraction from Complex Sulfide Wastes", Recycle and Secondary Recovery of Metals: Proceedings of the Int'l. Symposium on Recycle and Secondary Recovery of Metals and the Fall Extractive and Process Metallurgy Meeting: 1985, pp. 715-726.
Block-Bolten et al., "New Possibilities in the Extraction of Gold and Silver from Zinc and Lead Sulfide Flotation Wastes", TMS-AIME Fall Extractive Meeting, 1985, held in San Diego, CA, pp. 149-166.
Block-Bolten et al., "Thiosulfate Leaching of Gold from Sulfide Wastes", Metall. 40, Hahrgang, Heft 7, Jul. 1986, pp. 687-689.
Bouffard et al., "Mathematical Modeling of Pyritic Refractory Gold Ore Heap Biooxidation: Model Development and Isothermal Column Simulations", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 275-288.
Bourge, "Thiosulfate may replace cyanide in leaching", American Metal Market, 107(40) Mar. 2, 1999, 1 page.
Breuer et al. "A Review of the Chemistry, Electrochemistry and Kinetics of the Gold Thiosulfate Leaching Process" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 139-154.
Breuer et al., "An Electrochemical Study of Gold Oxidation in Solutions Containing Thiosulfate, Ammonia and Copper", Electrochemistry in Mineral and Metal Processing V, The Electrochemical Society, 2000, pp. 195-205.
Breuer et al., "Thiosulfate Leaching Kinetics of Gold in the Presence of Copper and Ammonia", Minerals Engineering, vol. 15, No. 10-11, 2000 Present at Hydromet 100, Adelaide, Australia, Apr. 2000, pp. 1071-1081.
Breuer et al., Fundamental Aspects of the Gold Thiosulfate leaching Process, to be presented at TMS Meeting, Feb. 2001, 16 pages.
Briones et al., "The Leaching of Silver Sulfide with the Thiosulfate-Ammonia-Cupric Ion System", Hydrometallurgy 20, 1998, pp. 243-260.
Brown et al., "Alternative Copper (II) Catalysts for Gold Leaching: Use of Multidentate Ligands to Control THiosulfate Oxidation" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 213-226.
Byerley et al., "Activation of Copper (II) Ammine Complexes by Molecular Oxygen for the Oxidation of Thiosulfate Ions", journal of Chemical Society: Dalton transactions, 1975, pp. 1329-1338.
Byerley et al., "Kinetics and Mechanism of the Oxidation of Thiosulphate Ions by Copper-(ii) Ions in Aqueous Ammonia Solution." Journal of the Chemical Society, Dalton Transactions, 1973, Issue 8, pp. 889-8934.
Byerley et al., "The Oxidation of Thiosulfate in Aqueous Ammonia by Copper (II) Oxygen Complexes", Inorg. Nucl. Chem. Letters, vol. 9, 1973, pp. 879-883.
Calistru, C. et al., "Modelling of the Production of Sodium Thiosulfate From Sulfite and Sulfur," Revista de Chimie, vol. 25, No. 3 (1974), pp. 197-200.

Caney, D.J., "Thiosulfate shows leach promise—U.S. government study shows costs about the same as cyanide," American Metal Market, vol. 102, No. 196 (Oct. 11, 1994), 1 page.
Chanda et al., "Ion-Exchange Sorption of Thiosulfate and Tetrathionate on Protonated Poly (4-Vinyl Pyridine)", Reactive Polymers, 2, 1984, pp. 269-278.
Chandra et al., "Can a Thiosulfate Leaching Process Be Developed Which Does Not Require Copper and Ammonia", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 169-182.
Changlin et al., "Leaching Gold by Low Concentration Thiosulfate Solution", Published in Transactions of NFsoc, vol. 2, No. 4, Nov. 1992, pp. 21-25.
Chen et al, "Electrochemistry of Gold Leaching with Thiosulfate (I) Behaviour and Mechanism of Anodic Dissolution of Gold", J. Cent. South Inst. Min. Metall. vol. 24, No. 1, Apr. 1993 (Published in Chinese), pp. 169-173.
Chen, Yougang et al., "Production of Sodium Thiosulfate From Reduced Waste Liquor Containing Sodium Sulfide," Chemical World, vol. 31, No. 3 (1990), pp. 130-132.
Coetzee et al. "Counter-current vs co-current flow in carbon-in-pulp adsorption circuits," Minerals Engineering, Apr. 1999, vol. 12, No. 4, pp. 415-422.
Cosano, J.S. et al., "Methods for Online Monitoring to be Implemented in an Ammonium Thiosulfate Production Plant," Analytica Chimica Acta, vol. 308, No. 1-3 (1995), pp. 187-196.
Costa, Hydrometallurgy of Gold: New Perspectives and Treatment of Refractory Sulphide Ores, Fizykochemiczne Problemy Mineralurgii, 1997, vol. 31, pp. 63-72.
Danehy, James P. et al., "Iodometric Method for the Determination of Dithionite, Bisulfite, and Thiosulfate in the Presence of Each Other and Its Use in Following the Decomposition of Aqueous Solutions of Sodium Dithionite," Analytical Chemistry, vol. 46, No. 3 (1974), pp. 391-395.
Das, Tomi Nath et al., "Reduction Potentials of $SO_3.Bul-$, $SO_5.Bul-$, and $S_4O_6.Bul.3$—Radicals in Aqueous Solution," The Journal of Physical Chemistry, vol. 103, No. 18 (1999), pp. 3581-3588.
de Jong et al., "Polythionate Degradation by Tetrathionate Hydrolase of Thiobacillus Ferrooxidans", Mirobiology (1997), 143, pp. 499-504.
Deschenes et al., "Cyanidation of a pyrrhotite-bearing old ore," European J. Mineral Processing & Environmental Protection, 2003, vol. 3(3), pp. 353-361.
Dhawale, "Thiosulfate—An Interesting Sulfur Oxoanion That Is Useful in Both Medicine and Industry—But Is Implicated in Corrision", Journal of Chemical Education, vol. 70, No. 1, Jan. 1993, pp. 12-14.
Dixon, D., "Heap Leach Modeling—The Current State of the Art", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 289-314.
Ege, Guenes N. et al., "PVP—A Practical Stabilizer for Technetium-99M-Sulfur Colloid," Journal of Nuclear Medicine, vol. 11, No. 4 (1970), pp. 175-176.
Feng et al., "Elution of Ion Exchange Resins by Use of Ultrasonication", Hydrometallurgy, 55 (2000), pp. 201-212.
Feng, D. et al., "Galvanic Interactions Between Sulphides and Manganese Dioxide in Thiosulphate Leaching of Gold Ores," Department of Chemical Engineering, The University of Melbourne, Victoria, 2001, pp. 1-39.
Feng et al., "The Role of Oxygen in Thiosulphate Leaching of Gold," Hydrometallurgy, 2007, vol. 85, pp. 193-202.
Ferron et al., "Thiosulphate Leaching of Gold and Silver Ores: An Old Process Revisited", Presented at 100.sup.th CIM Annual General Meeting, held in Montreal, Quebec, Canada May 3-7, 1998, 63 pages.

(56) References Cited

OTHER PUBLICATIONS

Ficeriov et al., "Cyanideless Methods of Leaching of the Gold and Silver Concentrate Coming from Hodrusa After Pretreatment by Ultrafine Grinding", Mineralia Slovaca, vol. 31 No. 3-4, 1999, pp. 363-368.
Ficeriova et al., "Thiosulfate leaching of gold from a mechanically activated CuPbZn concentrate," Hydrometallurgy, 2002, vol. 57(1-3), pp. 37-43.
Filho et al., "Contribuica Ao Estudo Da Dissoluca Do Ouro Pelo Tiossulfato", 49.sup.th International Congress on the Technology of Metals and Materials held in Sao Paulo Brazil, Mineral Technology, vol. IV, Oct. 1994, pp. 265-279.
Fleming et al., "Recent Advances in the Development of an Alternative to the Cyanidation Process—Based on Thiosulphate Leaching and Resin in Pulp", Paper presented at Ballarat, Nov. 2000, 27 pages.
Flett et al., "Chemical Study of Thiosulphate Leaching of Silver Sulphide", Trans. Instn. Min. Metall. 92, Dec. 1983, pp. C216-C223.
Foss et al., "Displacement of Sulphite Groups of Polythionates by Thiosulphate", Acta Chem. Scand. 15, 1961 No. 1, pp. 1608-1611.
Gadalla Ahmed M. et al., "Characterization of the Product of the Thiosulfate Process for Desulfurization of Flue Gases," Industrial & Engineering Chemistry Research, vol. 33, No. 5 (1994), pp. 1145-1149.
Gallagher et al., "Affinity of Activated Carbon Towards Some Gold (I) Complexes", Hydrometallurgy, 15, 1990, pp. 305-316.
Gallagher, "Interaction of Gold Cyanide, Thiocyanate, Thiosulfate, and Thiourea Complexes with Carbon Matrices", A thesis submitted in partial fulfillment of the requirements for the degree of Master of Science in Metallurgical Engineering, May 1987, University of Nevada, Reno, 194 pages.
Gelves et al., "Recovering of Refractory Gold Using Ammonium Thiosulfate Solutions", Clean Technology for the Mining Industry, Proceeding of the III International Conference on Clean Technologies for the Mining Industry held in Santiago, Chile, May 15-17, 1996, pp. 477-487.
Goldhaber, "Experimental Study of Metastable Sulfur Oxyanion Formation During Pyrite Oxidation at pH 6-9 and 30.degree. C", American Journal of Science, vol. 283, Mar. 1983, pp. 193-217.
Groudev et al., "Extraction of Gold and Silver from Oxide Ores by Means of a Combined Biological and Chemical Leaching", Biohydrometallurgical Technologies: Proceedings of an International Biohydrometallurgy Symposium, held in Jackson Hole, Wyoming, Aug. 22-25, 1993, pp. 417-425.
Groudev et al., "Pilot Scale Microbial Leaching of Gold and Silver from an Oxide in Eishitza Mine, Bulgaria", Mineral Bioprocessing II: Proceedings of the Engineering Foundation Conference Minerals Processing II, held in Snowbird, Utah, Jul. 10-15, 1995, pp. 35-144.
Groudev et al., "Two-Stage Microbial Leaching of a Refractory Gold-Bearing Pyrite Ore", Minerals Engineering, vol. 9, No. 7, 1996, pp. 707-713.
Groudev, et al., "A Combined Chemical and Biological Heap Leaching of an Oxide Gold-Bearing Ore", Physicochemical Problems of Mineral Processing, 33, pp. 55-61 1999.
Guerra et al., "A Study of the Factors Affecting copper Cementation of Gold from Ammoniacal Thiosulphate Solution", Hydrometallurgy 51 (1999), pp. 155-172.
Guerra, "A Study of the Factors Affecting Copper Cementation of Gold from Ammoniacal Thiosulphate Solution", A Thesis submitted in partial fulfillment of the requirements for the Degree of Master of Applied Science in the faculty of graduate studies, Nov. 1997, pp. 1-74.
Gundiler et al., "Thiosulphate leaching of Gold from Copper-Bearing Ores", Presented at the SME annual Meeting held in Reno, Nevada, Feb. 15-18, 1993, 13 pages.
Han et al., "Factors Influencing the Rate of Dissolution of Gold in Ammoniacal Solutions", Int. J. Miner. Process. 58, 2000, pp. 369-381.

Hemmati et al., "Study of the Thiosulphate Leaching of Gold from Carbonaceous Ore and the Quantitative Determination of Thiosulphate in the Leached Solutions", Papers presented at the Extraction'89 symposium, organized by the Institution of Mining and Metallurgy and held in London, from Jul. 10-13, 1989, pp. 665-678.
Hemmati, "A Study of the Thiosulfate Leaching of Gold from Carbonaceous Ore and the Quantitative Determination of Thiosulfate in the Leached Solution", A thesis submitted in partial fulfillment of the requirements for the degree of Master of Science in Metallurgical Engineering, Apr. 1987, University of Nevada, Reno, 19 pages.
Hiskey, J. Brent et al., "Dissolution Chemistry of Gold and Silver in Different Lixiviants," Mineral Processing and Extractive Metallurgy Review, vol. 4, Dec. 1988, pp. 95-134.
Hitchen et al., "A Review of Analytical Methods for the Determination of Polythionates, Thiosulphate, Sulphite and Sulphide in Mining Effluents", Report dated Aug. 1976, pp. 1-23.
Hitchen, "Preparation of Potassium Tetrathionate and Potassium Trithionate for Studies of the Thiosalt Problem in Mining Effluents", Report dated Oct. 1976, pp. 1-5.
Huang et al., "Theory and Practice of Leaching Gold by Thiosulfate", South Inst of Metallurgy PRC, vol. 19(9):1998, pp. 34-36.
Idriss et al., "A New Method for the Macro- and Microdetermination of Tri- and Tetrathionate", Can. J. Chem., col. 55, 1977, pp. 3887-3893.
Jacobson, R.H. et al., "Gold Solution Mining," Proceedings of a Symposium on Precious and Rare Metals, Albuquerque, NM, Apr. 6/8, 1988, pp. 157-174.
Jagushte et al., "Insight Into Spent Caustic Treatment: On Wet Oxidation of Thiosulfte to Sulfate", J. Chem Technol. Biotechnol, 74 (1999), pp. 437-444.
Jeffrey et al., "Ion exchange adsorptionand elution for recovering gold thosulfate from leach solutions," Hydrometallurgy, 2010, vol. 100(3-4), pp. 136-143.
Jeffrey et al., "The quantificationof thiosulfate and polythionates in gold leach solutions and on anion exhange resins," Hydrometallurgy, 2007, vol. 89(1-2), pp. 52-60.
Ji et al., "A Novel THiosulfate System for Leaching Gold Without the Use of Copper and Ammonium", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 227-244.
Ji et al., Research and Optimization of Thiosulfate leaching Techology of Gold, published in Rare Metals (A Chinese Journal of Science, Technology & Applications in the Field of Rare Metals), vol. 10, No. 4, Oct. 1991, pp. 275-280.
Jia, Xueshun et al., "Reductive Cleavage of S—S Bond by Samarium Diiodide: A Novel Method for the Synthesis of Disulfides," Synthetic Communications, vol. 24, No. 20 (1994), pp. 2893-2898.
Jian et al., "Leaching Gold and Silver by Lime-Sulphur-Synthetic-Solution (LSSS)", Xian Inst. Metall. Constr. Eng., vol. 16, 1992, pp. 389-393.
Jiang et al., "A Kinetic Study of Gold Leaching with Thiosulfate", Hydrometallurgy, Fundamentals, Technology and Innovations, AIME, Chapter 7, 1993, pp. 119-126.
Jiang et al., "Anodic Oxidation of Thiosulfate Ions in Gold Leaching", J. Cent. South Univ. Technol., vol. 4, No. 2, Nov. 1997, pp. 89-91.
Jiang et al., "Electrochemistry and Mechanism of Leaching Gold with Ammoniacal Thiosulphate", The Australasian Institute of Mining and Metallurgy Publication Series No. 3/93, vol. 5 Gold Processing, Hydrometallurgy and Dewatering and Miscellaneous, pp. 1141-1146 1993.
Jiang et al., "Gold and Silver Extraction by Ammoniacal Thiosulfate Catalytical Leaching at Ambient Temperature", Proceedings of the first International Conferences on Modern Process Mineralogy and Mineral Processing held in Beijing, China, Sep. 22-25, 1992, pp. 648-653.
Jiang et al., "Regularities of Thiosulfate Consumption and Leaching of Copper-Bearing Gold Ore", Mining and Metallurgical Engineering, vol. 16, No. 1, Mar. 1996, pp. 46-48.

(56) References Cited

OTHER PUBLICATIONS

Jiang et al., "Self-Catalytic Leaching of Gold . . . ", Nonferrous Metals, vol. 44(2), 1992, pp. 30-39.
Jiexue et al., "Recovery of Gold from Thiosulfate Solution", Engineering Chemistry and Metallurgy, vol. 10, No. 2, May 1989, pp. 45-50.
Jiexue et al., "Substitution of Sulfite with Sulfate in the Process of Extracting Gold by Thiosulfate Solution", Engineering Chemistry & Metallurgy, vol. 12, No. 4, Nov. 1991, pp. 302-305.
Johnson, et al., "Chemical Mining—A Study of Leaching Agents" New Mexico Bureau of Mines and Mineral Resources (1969), pp. 1-10.
Johnston et al., "Rates of Sulfur Production in Acid Thiosulfate Solutions Using Sulfur-35," Journal of Colloid and Interface Science, vol. 42, No. 1 (1973), pp. 112-119.
Kaczmarek, Tadeusz et al., "Chrystalline Sodium Thiosulfate Production in a Pilot Plant," Przemysl Chemiczny, vol. 64, No. 12 (1985), pp. 593-596.
Kaczmarek, Tadeusz et al.; "Up-To-Date Method of Chrystalline Sodium Thiosulfate Production," Przemysl Chemiczny, vol. 64, No. 9 (1985), pp. 431-434.
Kametani, Hiroshi et al.; "Separation and Identification of Sulfate," Journal of Mining and Metallurgical, vol. 103 (1987), pp. 799-804.
Kelly; "Oxidation of Thiosulphate During Chromatography in the Presence of Copper of Gold Ions"; Journal of Chromatography; col. 66,(1)J., 1972; pp. 185-188.
Kim et al., "Extraction of Gold from a Gold Ore by Ammonium Thiosulphate Leaching", J of the Korean Inst. of Metals, vol. 28, No. 12 (1990), pp. 1048-1053.
Koh et al., "Spectrophotometric Determination of Total Amounts of Polythionates (tetra-, Penta-, and Hexathionate) in Mixtures with Thiosulfate and Sulfite", Analytical Chemistry, vol. 45, Oct. 12, 1973, pp. 2018-2022.
Koh, et al.; "The Determination of Micro Amounts of Polythionates," Anal. Chin. Acta, vol. 61, Dec. 1972, pp. 451-460.
Kononova et al., "Sorption Recoveryj of Gold from Thiosulphate Solutions After Leaching of Products of Chemical Preparation of Hard Concentrates", Hydrometallurgy vol. 59, Jan. 2001, pp. 115-123.
Kravetz, "Cyanide Destruction Using Catalyzed Thiosulfates," Cherokee Chemical Engineering Company, Inc., 2000, 4 pages.
Kucha et al., Gold-Pyrite Association—Results of Oxysulphide and Polysulphide Transport of Gold, Trans. Instn. Min. Metall. (Sect. B: Appl. Earth Sci.) 103, Sep.-Dec. 1994.
Lam et al., "The Importance of the CU (II) Catalyst in the THiosulfate Leaching of Gold" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 195-211.
Lan et al., "Recovery of Gold by Thiosulfate and LSSS", Proceedings of the twenty-first International Precious Metals Conference held in San Francisco, California, 1997, p. 185.
Langhans et al., "Copper-Catalyzed Thiosulfate Leaching of Low-Grade Gold Ores", Hydrometallurgy, 29, 1992, pp. 191-203.
Langhans et al., "Gold Extraction from Low Grade Carbonaceous Ore Using Thiosulfate", Practical Aspects of International Management and Processing, SME, 1996, pp. 85-94.
Levenson et al., "The Stability of Concentrated Thiosulphate solutions at High Temperature. Part II. The Loss of the Sulphite", The Journal of Photographic Science, vol. 13, 1965, pp. 79-81.
Li et al., "Copper Catalyzed Ammoniacal Thiosulfate Leaching of Gold and Silver—Solution Chemistry", 1995, 34 pages.
Li et al., "Important Solution Chemistry Factors That Influence the Copper-Catalyzed Ammonium Thiosulfate Leaching of Gold", Presented at the 125.sup.th SME Annual Meeting held in Pheonix, Arizona, Mar. 11-14, 1996, pp. 1-20.
Li et al., "Leaching Gold with Thiosulphate Solution Containing Added Sodium Chloride and Sodium Dodecyl Sulphonate" Engineering Chemistry & Metallurgy, vol. 19, No. 1, Feb. 1998, pp. 76-82.
Li et al., "Studies on a United Non-Toxic Process to Recover Au/Cu from Complex Gold Ores Bearing Copper", Journal of Xiangtan Mining Institute, vol. 14, No. 2, 1999, pp. 50-54.
Li et al., "The Ammoniacal Thiosulfate System for Precious Metal Recovery", Published in the Proceedings of the XIX International Mineral Processing Congress, Precious Metals Processing and Mineral Waste and the Environment, vol. 4, 1995, Chapter 7, pp. 37-42.
Lukomskaya, "Extraction of Copper Gold and Silver from Tailings by Thiosulfate Heap Leaching.", Tsvetnye Metally, No. 4, Apr. 4, 1999, p. 48-49.
Makhija et al., "Determination of Polythionates and Thiosulphate in Mining Effluents and Mill Circuit Solutions", Talanta, vol. 25, 1978, pp. 79-84.
Makhija et al., "The Titrimetric Determination of Sulphate, Thiosulphate and Polythionates in Mining Effluents", Report dated Feb. 1978, pp. 1-14.
Makhija, "The Determination of Polythionates and Thiosulphate in Mining Effluents and Mill Circuit Samples," Mineral Sciences Laboratories Report MRP/MSL 76-361 (TR) (Dec. 1976), pp. 1-9.
Marcus, "The Anion Exchange of Metal Complexes—The Silver-Thiosulphate System", Published in the ACTA Chemica Scandinavica 11 (1957), pp. 619-627.
McPartland et al., "Concentration and Reduction of Au(I) Thiosulfate to Metallic Gold", Metal Separation Technologies Beyond 2000: Integrating Novel Chemistry with Processing, ed. by K.C. Liddell and D.J. Chaiko, TMS, 1999, pp. 105-115.
McPartland et al., "Leaching of precious Metal Ores Using Thiosulfate", Metal Separation Technologies Beyond 2000: Integrating Novel Chemistry with Processing. ed. by K.C. Liddell and D.J. Chaiko, TMS, 1999, pp. 93-103.
Meyer et al., "Raman Spectrometric Study of the Thermal Decomposition of Aqueous Tri- and Tetrathionate", Phosphorus and Sulfur, vol. 14, 1982, pp. 23-36.
Michel et al., "Integration of Amino Acids in the Thiosulfate Gold Leaching Process", Randol Gld & Silver Forum, 1999, pp. 99-103.
Michel, Didier et al., "Electrochemical Investigation of the Thiosulfate Gold Leaching Process," presented at CIM Gold Symposium, Montreal 98, May 1998, 12 pages.
Mizoguchi et al., "The Chemical Behavior of Low Valence Sulfur Compounds.X. .sup.1) Disproportionation of Thiosulfate, Trithionate, Tetrathionate and Sulfite Under Acidic Conditions", Bulletin of the Chemical Society of Japan, vol. 49(1), 1976, pp. 70-75.
Molleman, et al., "The Treatment of Copper-Gold Ores by Ammonium Thiosulfate Leaching", Hydrometallurgy, Elsevier Science, vol. 66 No. 1-3, Oct. 2002, pp. 1-21.
Murthy et al., "Leaching of Gold and Silver from Miller Process Dross Through Non-Cyanide Leachants", Hydrometallurgy 42, 1996, pp. 27-33.
Murthy, "Some Studies on the Extraction of Gold and Silver from Lead-Zinc Sulphide Flotation Tailings through Non-Cyanide Leachants", Trans. Indian inst. Met. vol. 44, No. 5, Oct. 1991, pp. 349-354.
Naito et al., "The Chemical Behavior of Low Valence Sulfur Compounds. III. Production of Ammonium Sulfamate by the Oxidation of Ammonium Thiosulfate", Bulletin of the Chemical Society of Japan, vol. 43, 1970, pp. 1365-1372.
Naito et al., "The Chemical Behavior of Low Valence Sulfur Compounds. V. Decomposition and Oxidation of Terathionate in Aqueous Ammonia Solution", Bulletin of the Chemical Society of Japan, vol. 43, 1970, pp. 1372-1376.
Naito et al., "The Reactions of Polythionates Kinetics of the Cleavage of Trithionate Ion in Aqueous Solutions", J. inorg. Nucl. Chem., vol. 37, 1975, pp. 1453-1457.
Nicol et al., "Recovery of Gold From Thiosulfate Solutions and Pulps With Ion-Exchange Resins", presented at TMS Annual Meeting, New Orleans, LA Feb. 11-15, 2001.
Niinae et al., "Preferential Leaching of Cobalt, Nickel and Copper from Cobalt-rich Feromanganese Crusts with Ammoniacal Solu-

(56) References Cited

OTHER PUBLICATIONS tions using Ammonium Thiosulfate and Ammonium Sulfite as Reducing Agent", Hydrometallurgy, vol. 40, 1996, pp. 111-121.
No Author, "And So Does a Novel Lixiviant", Chemical Engineering, vol. 102(3), Mar. 1995, p. 25.
No Author, "Gold Extraction Method Offers Companies an Alternative to Cyanide", JOM: The Journal of the Minerals, Metals & Materials Society, vol. 46(11), Nov. 1994, p. 4.
Nord et al., "The Oxidation of Thiosulfate by the Tetramminegold (III) ion in Aqueous Solution", Acta Chemica Scandinavica A 29, 1975, pp. 505-512.
Ofori-Sarpong et al., "Myco-hydrometallurgy: coal model for potential reduction of preg-robbing capacity of carbonaceous gold ores using the fungus, *Phanerochaete chrysosporium*," Hydrometallurgy, 2010, vol. 102, pp. 66-72, abstract only.
O'Malley, "Recovery of Gold from Thiosulfate Solutions and Pulps with Anion-Exchange Resins," PhD thesis, Murdoch University, 2002, 284 pages.
Osaka et al., Electrodeposition of Soft Gold from a Thiosulfate-Sulfite Bath for Electronics Appications, J. Electrochem. Soc., vol. 144, No. 10, Oct. 1997, pp. 3462-3469.
Panayotov, "A Technology for Thiosulphate Leaching of Au and Ag from Pyrite Concentrates", Changing Scopes in Mineral Processing: proceedings of the 6.sup.th International Mineral Processing Symposium, Kusadasi, Turkey, Sep. 24-26, 1996, pp. 563-565.
Pedraza et al., "Electro-Oxidation of Thiosulphate Ion on Gold-study by means of Cyclic Voltammetry and Auger Electron Spectroscopy", J. Electroanal. Chem., 250, 1988, pp. 443-449.
Pyke et al., "The Characterisation and Behaviour of Carbonaceous Material in a Refractory Gold Bearing Ore," 1999, vol. 99, pp. 851-862.
Qian et al., "Kinetics of Gold Leaching from Sulfide Gold Concentrates with Thiosulfate Solution", Transaction of Nfsoc vol. 3, No. 4, Nov. 1993, pp. 30-36.
Qian et al., "Treatment of sulphide Gold Concentrate Containing Copper with Thiosulfate Solution" (published in Chinese), Engineering Chemist, vol. Iss, 11,May 2, 1990, pp. 145-151.
Qian et al., "Treatment of Sulphide Gold Concentrate Containing Copper with Thiosulfate Solution", Proceedings of Randol Gold Conference, Sacramento 1989, pp. 131-135.
Rolia et al., "Oxidation of Thiosalts with Hydrogen Peroxide", Report dated May 1984, pp. 1-26.
Rolia et al., "The Kinetics of Decomposition of Tetrathionate, Trithionate and Thiosulphate in Alkaline Media", Report dated Mar. 1981, pp. 1-34.
Rolia et al., The Oxidation of Thiosulphate by Hydrogen Peroxide in Alkaline Solution, Report dated Jul. 1984, pp. 1-14.
Rolia, et al., "Effect of pH and Retention Time on the Degradation of Thiosalts," CANMET Mineral Sciences Laboratories Report MRP/MSL 79-8 (TR) (Jan. 1979), pp. 1-16.
Rolia, et al., "Oxidation of Thiosalts by S02 Plus Air, Charcoal Plus Air, and Chlorine," CANMET Mineral Sciences Laboratories Report MRP/MSL 79-85 (TR) (Jun. 1979), pp. 8-12.
Rolia, "Kinetics of Decomposition of Tetrathionate, Trithionate and Thiosulfate in Alkaline Media", Environ. Sci. Technol. 1982, 16, pp. 852-857.
Rolia, "The Kinetics of Decomposition of Tetrathionate, Trithionate and Thiosulphate in Alkaline Solution", A Thesis submitted to the School of Graduate Studies in partial fulfillment of the requirements for the Degree of Master of Science Carleton University, Sep. 1981, pp. 1-170.
Rolia, "The Kinetics of Decomposition of Thiosalts by Metallic Iron", Report dated Jun. 1981, pp. 1-19.
Rolia; "The Oxidation of Thiosalts in Strongly Alkaline Media"; Report dated Nov. 1981; p. 28.
Rong Yu Wan et al., "Research and Development Activities for the Recovery of Gold from Noncyanide Solutions," Hydrometallurgy Fundamentals, Technology and Innovation (J.B. Hisky & G.W. Warren, Eds. 1993) pp. 415-436.

Schippers et al., "Bacterial Leaching of Metal Sulfides Proceeds by Two Indirect Mechanisms via Thiosulfate or via Polysulfides and Sulfur," Applied and Environmental Microbiology (Jan. 1999) pp. 319-321.
Schmitz, P. A., "Ammoniacal thiosulfate and sodium cyanide leaching of preg-robbing Goldstrike ore carbonaceous matter," Elsevier, Hydrometallurygy 60 (2001) pp. 25-40, 2001.
Senanayake et al., Thermodynamic Studies of the Gold (III) (I)/(0) Redox System in Ammonia—Thiosulphate Solutions at 25° C., Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 155-168.
Siu et al., "Kinetics of Reaction of Sulfide with Thiosulfate in Aqueous Solution", Ind. Eng. Chem. Res., 1999, 38, pp. 1306-1309.
Smith et al., "Aqueous Solution Chemistry of Polythionates and Thiosulphate: A Review of Formation and Degradation Pathways", Mineral Sciences Laboratories Report MRP/MSL 76-223 (LS), Canmet, Aug. 1976, pp. 1-29.
Steudel et al., "The Molecular Nature of the Hydrophilic Sulfur Prepared from Aqueous Sulfide and Sulfite (Selmi Sulfur Sol)", Z. Naturforsch. Bc, 1989, 44:4, pp. 526-530.
Steudel et al., "The Moledular Composition of Hydrophilic Sulfur Sols Prepared by Acid Decomposition of Thiosulfate," Zeitschrift fur Naturforschung, vol. 43, No. 2 (1988), pp. 203-218.
Subramanian et al. (1980) 'Reverse Osmosis Separation of Thiosalts from Mining Effluents', Separation Science and Technology, 15: 5, 1205-1211.
Sullivan et al., "The Autocatalytic Deposition of Gold in Nonalkaline, Gold Thiosulfate Electroless Batch", J. Electrochem. Soc., vol. 142, No. 7, Jul. 1995, pp. 2250-2255.
Ter-Arakelyan et al., "Technological Expediency of Sodium Thiosulphate for the Extraction of Gold from Ores", Soviety Non-Ferrous Metals Research, vol. 12, No. 5, 1984, pp. 393-397.
Ter-Arakelyan, et al., "Sodium Thiosulfate an Extraction of", Izvestiia Vysshikh Uchebnykh Zaedenii, Tsvetnaia Metallurgiia, vol. ISS 5, 1984, pp. 72-76.
Tozawa et al., "Dissolution of Gold in Ammoniacal Thiosulfate Solution", Metallurgical Society AIME, 1981, pp. 1-12 and cover.
Tykodi, "In Praise of Thiosulfate", Journal of Chemical Education, 1990, vol. 68, pp. 146-149.
Umetsu et al., "Dissolution of Gold in Ammoniacal Sodium Thiosulfate Solution", AIME World Lead-Zinc Symposium, vol. II, 1970, pp. 97-104.
Vandeputte et al., "Influence of the Sodium Nitrate Content on the Rate of the Electrodeposition of Silver from Thiosulphate Solutions", Electrochimica Acta. vol. 42, Nos. 23-24, 1997, pp. 3429-3441.
von Michaelis et al., "The Prospects for Alternative Leach Reagents—Can Precious metals Producers Get Along With Cyanide?", Engineering and Mining Journal, Jun. 1987, pp. 42-47.
Wan et al., "Thiosulfate Leaching Following Biooxidation Pretreatment for Gold Recovery from Refractory Carbonaceous-Sulfidic Ore", Mining Engineering, Aug. 1997, pp. 76-80.
Wan R.Y. et al., "Solution Chemistry Factors for Gold Thiosulfate Heap Leaching," International Jounral of Mineral Processing, (Jul. 1, 2003), pp. 311-322.
Wan, "Importance of Solution Chemistry for Thiosulphate Leaching of Gold", Presented at the World Gold '97 Conference in Singapore, Sep. 1-3, 1997, pp. 159-162.
Wang et al., "A Novel Gold Electroplating System: Gold (I)-Iodide-Thiosulfate", J. Electrochem. Soc., vol. 145, No. 3, Mar. 1998.
Wang, "Thermodynamic Equilibrium Calculations on Au/Ag-Lixiviant Systems Relevant to Gold Extraction from complex Ores", Proceedings of the Third International Symposium on Electrochemistry in Mineral and Metal Processing III, 1992, pp. 452-477.
Webster, "Thiosulphate Complexing in Gold and Silver During the Oxidation of a Sulphide-Bearing Carbonate Lode System, Upper Ridges Mine, P.N.G.", The Aus. I.M.M. Perth and Kaigoorlie Branches, Region conference on Gold-Mining Metallurgy and Geology, Oct. 1984, pp. 437-445.

(56) References Cited

OTHER PUBLICATIONS

Wenge et al., "Studies on Leaching Gold and Silver from Gold Concentrates and Silver Pyrites Associated with Complex Metals Sulphides by Ammoniacal Thiosulfate" (published in Chinese), Non Ferrous Metals, vol. 39, No. 4, Nov. 1987, pp. 71-76.
Wentzien et al., "Thiosulfate and Tetrathionate Degradation as well as Biofilm Generation by Thiobacillus Intermedius and Thiobacillus Versutus Studied by Microcalorimetry, HPLC, and Ion-pair Chromatography", Arch Microbiol. 161, 1994, pp. 116-125.
West-Sells et al., "A Process for Counteracting the Detrimental Effect of Tetrathionate on Resin Gold Adsorption From Thiosulfate Leachates", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 245-256.
Yang et al., "Leaching Gold from Refractory Gold Ore Bearing Arsenic by Thiosulfate Process", Journal of Yunnan University, 19:5, 1997, pp. 508-514.
Yang, Ming et al., "Application of Catalytic Oxidation to PR," Guangxi Chemical Industry, vol. 28 (1999), pp. 18-19, 25.
Yen et al., "Development in Percolation Leaching with Ammonium Thiosulfate for Gold Extraction of a Mild Refractory Ore", EPD Congress 1999, The Minerals & Materials Society, 1999, Paper at the TMS, Mar. 1-3, 1999, held in San Diego, California, pp. 441-455.
Yen et al., "Gold Extraction from Mildly Refractory Ore Using Ammonium Thiosulphate", International Symposium of Gold Recovery, May 4-7, 1998, Montreal, Quebec, Canada.
Yokosuka et al., "Chemical Behaviour of Low-Valent Sulfur Compounds XII Oxidation of Sodium Thiosulfate with Hydrogen Peroxide and Sodium Hypochlorite", Journal of the Japan Chemistry Society, 11, 1975, pp. 1901-1909.
Zhang "Oxidation of Refractory gold Concentrates and Simultaneous Dissolution of Gold in Aerated Alkaline Solutions", Thesis, Murdock University, Australia, Mar. 2004, 358 pages.
Zhang et al., "Gold Extraction by Ammoniacal Thiosulfate Leaching from the Roasted Copper-Bearing Sulphureous Gold Concentrate", Huangjin Bianjibu, PRC, vol. 20 (7), 1999, pp. 32-35.
Zhao et al., "Extraction of gold from thiosulfate solutions using amine mixed with neutral donor reagents", Hydrometallurgy 48, 1998, pp. 133-144.
Zhao et al., "Extraction of gold from thiosulfate solutions with alkyl phosphorus esters", Hydrometallurgy 46 (1997) pp. 363-372.
Zhao et al., "Gold Extraction from Thiosulfate Solutions Using Mixed Amines", Solvent Extraction and Ion Exchange, 16(6), 1998, pp. 1407-1420.
Zhu et al., "Electrochemical Studies on the Mechanism of Gold Dissolution in Thiosulfate Solutions", Transactions of NFsoc, vol. 4, No. 1, 1991, pp. 50-53.
Zhu et al., "Oxidation Kinetics of Thiosulfate and Polysulfide Mixture", Engineering Chemistry & Metallurgy, vol. 17, No. 1, 1996, pp. 26-31.
Zhu, Guocai et al.' "Leaching of Gold from Sulfide Concentrates with Thiosulfate/Polysulfide Produced by Disproportionation of Elemental Sulfur in Ammoniacal Media," Papers Presented at the International Symposium Hydrometallurgy '94, pp. 541-546.
Zhuchkov et al., "Copper Sulfide Dissolution Kinetics in Thio . . . ", Izvestiia Vysshikh Uchebnykh Zavedenii Tsvetnaia Metallurgiia, vol. ISS 5-6, 1992, pp. 56-62.
Zilberman et al., "Decomposition of polythionates", Russian Journal of Inorganic Chemistry, vol. 14, No. 8, 1969, pp. 1203-1204.
Zipperian et al., "Gold and Silver Extraction by Ammoniacal Thiosulfate Leaching from a Ryolite Ore", Hydrometallurgy, vol. 19, 1988 pp. 361-375.
Australian Patent Office Examiner's First Report on Australian Patent Application No. 18525/99, dated Sep. 26, 2001, 2 pages.
Canadian Patent Office First Office Action on Canadian Patent Application No. 2,278,044, dated Sep. 21, 2006, 2 pages.
Official Action for Argentine Patent Application No. P060102243, dated Jun. 17, 2012, 1 page.
Translation of Official Action for Argentine Patent Application No. P060102244, dated Jun. 8, 2012, 1 page.
Official Action for Chile Patent Application No. 1163-2001, dated Apr. 29, 2011, 7 pages.
Official Action with mechanical English translation for Chile Patent Application No. 1163/2001, dated Feb. 13, 2012, 6 pages.
Official Action for Chile Patent Application No. 1615/2014, dated Feb. 29, 2016 9 pages No translation.
Official Action for Chile Patent Application No. 1615/2014, dated Feb. 6, 2017 8 pages No translation.
Official Action for Chile Patent Application No. 2014-001620, dated Feb. 9, 2016 8 pages No translation.
Official Action for Chile Patent Application No. 2014-001620, dated Feb. 6, 2017 7 pages No translation.
Peruvian Patent Office Technical Report No. LPC 46-2004, 12 pages.
Search Report for International (PCT) Patent Application No. PCT/IB01/01119, dated Jul. 2, 2002, 8 pages.
Written Opinion for International (PCT) Patent Application No. PCT/IB01/01119, dated Nov. 6, 2002, 2 pages.
International Preliminary Examination Report for International (PCT) Patent Application No. PCT/IB01/01119, dated Jan. 10, 2003, 22 pages.
Examiner's First Report for Australian Application No. 2001274393 dated Apr. 18, 2005, 2 pages.
Examiner's Report No. 2 for Australian Application No. 2001274393 dated Mar. 27, 2006, 2 pages.
Examiner's Report No. 3 for Australian Application No. 2001274393 dated Apr. 28, 2006, 2 pages.
Examiner's Report No. 4 for Australian Application No. 2001274393 dated Jul. 25, 2006, 2 pages.
Australian Patent Office Examiner's Report No. 2 on Australian Patent Application No. 2006/200966, dated Dec. 14, 2006, 2 pages.
Australian Patent Office Examiner's First Report on Australian Patent Application No. 2006/200967, dated Jul. 4, 2006, 2 pages.
Office Action for Canadian Patent Application No. 2,409,378, dated Jan. 26, 2007.
Office Action for Canadian Patent Application No. 2,409,378, dated May 22, 2008.
Notice of Allowance for Canadian Patent Application No. 2,409,378, dated Aug. 10, 2009.
Office Action for Canadian Patent Application No. 2,620,644, dated Oct. 14, 2008.
Notice of Allowance for Canadian Patent Application No. 2,620,644, dated Jul. 14, 2009.
Office Action for Canadian Patent Application No. 2,617,457, dated Oct. 14, 2008.
Official Action for Canadian Patent Application No. 2,617,457, dated Jul. 9, 2010.
Office Action for Canadian Patent Application No. 2,617,457, dated Jul. 10, 2009.
Notice of Allowance for Canada Patent Application No. 2,617,457, dated Feb. 18, 2011 1 page.
Office Action for Canadian Patent Application No. 2,617,415, dated May 28, 2008.
Notice of Allowance for Canadian Patent Application No. 2,617,415, dated Jul. 14, 2009, 3 pages.
Notice of Allowance for Canada Patent Application No. 2,664,756, dated Mar. 28, 2012 1 page.
Official Action for Canadian Patent Application No. 2,664,756, dated May 14, 2010, 3 pages.
Official Action for Canada Patent Application No. 2664756, dated Feb. 15, 2011, 2 pages.
Official Action for Canadian Patent Application No. 2,698,578, dated Nov. 23, 2010, 3 pages.
Official Action for Canada Patent Application No. 2,698,578, dated Jan. 26, 2012 2 pages.
Official Action for Canadian Patent Application No. 2,698,578, dated Feb. 4, 2013, 2 pages.
Notice of Allowance for Canadian Patent Application No. 2,698,578, dated Nov. 7, 2013, 1 page.

(56) References Cited

OTHER PUBLICATIONS

Official Action for Canadian Patent Application No. 2,745,806, dated Nov. 29, 2012, 3 pages.
Official Action for Canadian Patent Application No. 2,745,806, dated Nov. 4, 2013, 2 pages.
Official Action for Canadian Patent Application No. 2,745,806, dated Apr. 30, 2014, 2 pages.
Official Action for Canadian Patent Application No. 2,745,928, dated Nov. 28, 2012, 3 pages.
Notice of Allowance for Canada Patent Application No. 2,745,933, dated Oct. 12, 2011, 1 page.
Official Action for Canada Patent Application No. 2,756,715, dated Apr. 29, 2013, 2 pages.
Notice of Allowance for Canada Patent Application No. 2,756,715, dated Mar. 18, 2014, 1 pages.
Office Action for Canada Patent Application No. 2,864,359, dated Dec. 12, 2014, 3 pages.
Office Action for Canada Patent Application No. 2,864,359, dated Oct. 26, 2015, 1 pages.
UK Patent Office Examination Report on UK Patent Application No. 0226199.8, dated Nov. 12, 2003, 5 pages.
UK Patent Office Further Examination Report on UK Patent Application No. 0226199.8, dated May 21, 2004, 3 pages.
UK Patent Office Further Examination Report on UK Patent Application No. 0226199.8, dated Aug. 9, 2004, 3 pages.
UK Patent Office Further Examination Report on UK Patent Application No. 0226199.8, dated Sep. 21, 2004, 2 pages.
Official Action for Mexico Patent Application No. MX/a/2007/010084, dated Aug. 5, 2011 2 pages.
Office Action for Canadian Patent Application No. 2,424,714, dated Jan. 26, 2009.
Office Action for Canadian Patent Application No. 2,424,714, dated Sep. 14, 2009, 3 pages.
Notice of Allowance for Canadian Patent Application No. 2,424,714, dated Jul. 8, 2010, 1 page.
Official Action for Argentine Patent Application No. P030104232, date unknown, 1 page.
Translation of Report Previous to Final Decision for Argentine Patent Application No. P030104232, date unknown, 1 page.
Office Action for Canadian Patent Application No. 2,449,467, dated Sep. 13, 2007, 3 pages.
Office Action for Canadian Patent Application No. 2,449,467, dated Jan. 28, 2009, 2 pages.
Notice of Allowance for Canadian Patent Application No. 2,449,467, dated Sep. 14, 2009, 1 page.
Official Action for Canada Patent Application No. 2,691,607, dated Aug. 8, 2011 3 pages.
Office Action for Canadian Patent Application No. 2,691,607, dated Apr. 4, 2013, 3 pages.
Notice of Allowance for Canadian Patent Application No. 2,691,607, dated Mar. 19, 2014, 1 page.
Office Action for Canadian Patent Application No. 2,850,217, dated Jun. 1, 2016, 4 pages.
Office Action for Canadian Patent Application No. 2,850,216, dated Nov. 14, 2014, 3 pages.
Examination Report for Chilean Patent Application No. 2361/2003, dated May 7, 2007, 9 pages.
International Search Report for counterpart PCT application PCT/IB 03/06475 dated Jun. 30, 2006, 10 pages.
Written Opinion for counterpart PCT application PCT/IB 03/06475 dated Oct. 19, 2006, 2 pages.
International Preliminary Examination Report for counterpart PCT application PCT/IB 03/06475 dated Dec. 13, 2006, 3 pages.
Substantive Examination Report for ARIPO Patent Application No. AP/P/2005/003335, dated Aug. 18, 2008, 4 pages.
Examination Report and Form No. 21 for ARIPO Patent Application No. AP/P/2005/003335, dated Jan. 29, 2009, 4 pages.
Notice of Allowance for African Regional Intellectual Property Organization (ARIPO) Patent Application No. AP/P/2009/004750, dated Jul. 23, 2012 5 pages.

Notice of Acceptance for Australian Patent Application No. 2003302110, dated Sep. 19, 2007, 1 page.
Examiner's Report for Australian Patent Application No. 2007211912, dated Dec. 7, 2007.
Notice of Acceptance for Australian Patent Application No. 2007211912, dated Jan. 16, 2008, 1 page.
Office Action for Canadian Patent Application No. 2,505,740, dated Jun. 4, 2008, 4 pages.
Office Action for Canadian Patent Application No. 2,505,740, dated Jul. 16, 2009, 1 page.
Notice of Allowance for Canadian Patent Application No. 2,505,740, dated Apr. 6, 2010.
Official Action for Canada Patent Application No. 2,716,442, dated Jul. 5, 2011 4 pages.
Official Action for Canada Patent Application No. 2,716,442, dated Apr. 3, 2012 3 pages.
Notice of Allowance for Canadian Patent Application No. 2,716,442 dated Feb. 19, 2013, 1 page.
UK Patent Office Examination Report on UK Patent Application No. GB0509741.5, dated Dec. 22, 2005, 6 pages.
UK Search and Examination Report (GB 0509741.5), dated Apr. 13, 2006, in co-pending related application, 12 pages.
UK Patent Office Examination Report on UK Patent Application No. GB0509741.5, dated Oct. 4, 2006.
UK Patent Office Combined Search and Examination Report on UK Patent Application No. GB0612107.3, dated Oct. 4, 2006, 5 pages.
UK Patent Office Combined Search and Examination Report on UK Patent Application No. GB0612108.1, dated Oct. 4, 2006, 4 pages.
UK Patent Office Search and Examination Report on UK Patent Application No. GB0612108.1, dated Mar. 5, 2007, 3 pages.
International Search Report and Written Opinion for International (PCT) Patent Application No. PCT/IB2011/003096, dated May 2, 2012 7 pages.
International Preliminary Report on Patentability for International (PCT) Patent Application No. PCT/IB2011/003096, dated Jun. 20, 2013 5 pages.
Notice of Acceptance for ARIPO Patent Application No. AP/P/2013/006961, dated Sep. 2, 2015 5 pages.
Notice of Acceptance for Australian Patent Application No. 2011340196, dated Nov. 25, 2015, 2 pages.
Official Action for Australian Patent Application No. 2016200323, dated Sep. 15, 2016, 3 pages.
Official Action for Australian Patent Application No. 2016200323, dated May 26, 2017, 4 pages.
Official Action for Australian Patent Application No. 2016200323, dated Jul. 19, 2017, 5 pages.
Notice of Allowance for Australian Patent Application No. 2016200323, dated Aug. 22, 2017, 3 pages.
Official Action for Canada Patent Application No. 2,820,700, dated Oct. 23, 2014, 2 page.
Notice of Allowance for Canada Patent Application No. 2,820,700, dated Mar. 19, 2015 1 page.
Official Action for Canada Patent Application No. 2,863,875, dated Dec. 21, 2016 3 pages.
Official Action for Canada Patent Application No. 2,863,875, dated Sep. 14, 2017 4 pages.
Notice of Allowance for Canada Patent Application No. 2,863,875, dated Jun. 14, 2018, 1 page.
Official Action for Chile Patent Application No. 1619-2013, dated Apr. 30, 2015 8 pages.
Notice of Allowance for Chile Patent Application No. 1619-2013, dated May 26, 2016 1 page.
Official Action (no English translation available) for Dominican Republic Patent Application No. P2013-0119, dated Feb. 11, 2019, 3 pages.
Official Action (with English translation) for Eurasian Patent Application No. 2015 01 143, dated Aug. 16, 2017 4 pages.
Official Action (with English translation) for Eurasian Patent Application No. 2015 01 143, dated Feb. 13, 2018, 4 pages.
Extended Search Report for European Patent Application No. 11846831.3, dated Aug. 14, 2015 5 pages.
Official Action for European Patent Application No. 11846831.3, dated Dec. 22, 2016 3 pages.

(56) References Cited

OTHER PUBLICATIONS

Official Action for European Patent Application No. 11846831.3, dated Sep. 19, 2017 3 pages.
Official Action for European Patent Application No. 11846831.3, dated Feb. 2, 2018 3 pages.
Notice of Allowance for European Patent Application No. 11846831.3, dated Aug. 13, 2018, 27 pages.
Extended European Search Report for Euorpean Patent Application No. 18155275.3, dated May 6, 2018, 7 pages.
Official Action for European Patent Application No. 18155275.3, dated Jun. 3, 2019, 4 pages.
Official Action for Indonesia Patent Application No. P00 2014 04613 dated Sep. 8, 2014, 2 pages.
Official Action for Indonesia Patent Application No. PP00 2014 04613 dated Jul. 19, 2017, 6 pages.
Office Action (with English summary) for Mexican Patent Application No. MX/a/2013/006124, dated Jul. 28, 2016, 10 pages.
Notice of Allowance for Mexican Patent Application No. MX/a/2013/006124, dated May 12, 2017, 1 page.
Notice of Acceptance for New Zealand Patent Application No. 611643 dated Jun. 5, 2014, 2 pages.
Official Action for New Zealand Patent Application No. 623104 dated Apr. 7, 2014, 2 pages.
Official Action for Philippines Patent Application No. 1-2013-501134 dated Sep. 3, 2014, 1 page.
Official Action for Philippines Patent Application No. 1-2013-501134 dated Oct. 1, 2014, 1 page.
Official Action for Philippines Patent Application No. 1-2014-502431 dated Aug. 31, 2016, 3 pages.
Official Action for Philippines Patent Application No. 1-2014-502431 dated Jul. 6, 2017, 2 pages.
International Search Report for International Patent Application No. PCT/US12/42615 dated Aug. 31, 2012, 4 pages.
Written Opinion for International Patent Application No. PCT/US12/42615 dated Aug. 31, 2012, 4 pages.
International Preliminary Report on Patentability for International Patent Application No. PCT/US12/42615 dated May 31, 2013, 4 pages.
Official Action (English translation only) for Brazilian Patent Application No. BR112013032149-0, dated May 18, 2018, 7 pages.
Official Action (English translation only) for Brazilian Patent Application No. BR112013032149-0, dated Sep. 10, 2018, 4 pages.
Official Action for Canadian Patent Application No. 2,838,901, dated Mar. 11, 2015 4 pages.
Official Action (no English translation available) for Chilean Patent Application No. 3580-2013, dated Aug. 9, 2019, 2 pages.
Official Action (no English translation available) for Dominican Republic Patent Application No. P2013-0303, dated Mar. 28, 2019 6 pages.
Official Action (no English translation available) for Dominican Republic Patent Application No. P2013-0303, dated Oct. 11, 2019, 11 pages.
Official Action for Eurasian Patent Application No. 201400021, dated Feb. 3, 2016 4 pages.
Official Action for Eurasian Patent Application No. 201400021, dated Aug. 31, 2016 4 pages.
Extended European Search Report for European Patent Application No. 12800341.5, dated May 19, 2015, 7 pages.
Extended European Search Report for European Patent Application No. 17193704.8, dated Mar. 8, 2018, 7 pages.
Official Action (with English translation) for Japanese Patent Application No. 2014-516019, dated May 24, 2016 5 pages.
Official Action (no translation available) for Japanese Patent Application No. 2014-516019, dated Feb. 15, 2018 5 pages.
Notice of Allowance for Japanese Patent Application No. 2014-516019 dated Jul. 3, 2018, 3 pages.
International Search Report and Written Opinion for International (PCT) Patent Application No. PCT/IB2014/001378, dated Oct. 14, 2014 9 pages.
International Preliminary Report on Patentability for International (PCT) Patent Application No. PCT/IB2014/001378, dated Dec. 10, 2015 7 pages.
Notice of Acceptance for Australian Patent Application No. 2014272803, dated Apr. 6, 2018, 3 pages.
Examiner's Report for Canadian Patent Application No. 2,915,269, dated Nov. 9, 2018, 3 pages.
Notice of Reallowance for Canada Patent Application No. 2,915,269, dated Jun. 27, 2019 1 page.
Office Action (no translation available) for Chilean Patent Application No. 201503410, dated Sep. 21, 2017, 9 pages.
Office Action (no translation available) for Chilean Patent Application No. 201503410, dated Mar. 23, 2018, 8 pages.
Official Action for Dominican Patent Application No. P2015-0280, dated Sep. 21, 2018, 4 pages.
Notice of Allowance (no English translation available) for Dominican Republic Patent Application No. P2015-0280, dated Mar. 12, 2019, 35 pages.
Official Action for Eurasian Patent Application No. 201501141, dated Aug. 11, 2017, 2 pages.
Official Action for Eurasian Patent Application No. 201501141, dated Nov. 19, 2018, 5 pages.
Extended European Search Report for European Patent Application No. 14803553.8, dated Jan. 31, 2017, 9 pages.
Intent to Grant for European Patent Application No. 14803553.8, dated Mar. 6, 2018, 27 pages.
Official Action (with English translation) for Japanese Patent Application No. 2016-516258, dated May 29, 2018, 7 pages.
Official Action (no English translation available) for Japanese Patent Application No. 2016-516258, dated Dec. 18, 2018, 2 pages.
Decision to Grant (no English translation available) Japanese Patent Application No. 2016-516258. dated Aug. 6, 2019, 3 pages.
Office Action for U.S. Appl. No. 10/446,548 dated Jul. 7, 2004, 6 pages.
Office Action for U.S. Appl. No. 10/446,548 dated Dec. 28, 2004, 7 pages.
Office Action for U.S. Appl. No. 10/446,548 dated Jun. 10, 2005, 8 pages.
Office Action for U.S. Appl. No. 11/927,170, dated Jun. 20, 2008, 12 pages.
Office Action for U.S. Appl. No. 11/927,170, dated Dec. 10, 2008, 19 pages.
Notice of Allowance for U.S. Appl. No. 11/927,170, dated Mar. 6, 2009, 13 pages.
Office Action for U.S. Appl. No. 10/836,480 dated Oct. 14, 2005, 17 pages.
Office Action for U.S. Appl. No. 10/836,480 dated Apr. 3, 2006, 6 pages.
Office Action for U.S. Appl. No. 10/836,480 dated Mar. 23, 2007, 11 pages.
Office Action for U.S. Appl. No. 10/836,480 dated Aug. 27, 2007, 12 pages.
Office Action for U.S. Appl. No. 10/836,480 dated Dec. 28, 2007, 8 pages.
Office Action for U.S. Appl. No. 10/836,480 dated Jul. 9, 2008, 9 pages.
Office Action for U.S. Appl. No. 10/836,480 dated Dec. 24, 2008, 21 pages.
Notice of Allowance for U.S. Appl. No. 10/836,480 dated Oct. 7, 2009, 9 pages.
Office Action for U.S. Appl. No. 12/700,525, dated Jun. 18, 2010, 6 pages (Restriction Requirement).
Office Action for U.S. Appl. No. 12/700,525 dated Sep. 17, 2010, 12 pages.
Official Action for U.S. Appl. No. 12/700,525, dated Mar. 17, 2011, 20 pages.
Official Action for U.S. Appl. No. 12/700,525, dated Aug. 21, 2013 23 pages.
Official Action for U.S. Appl. No. 12/700,525, dated Jan. 6, 2014, 9 pages.
Notice of Allowance for U.S. Appl. No. 12/700,525, dated Apr. 15, 2014, 9 pages.

(56) References Cited

OTHER PUBLICATIONS

Official Action for U.S. Appl. No. 13/020,505, dated Jan. 17, 2012 5 pages Restriction Requirement.
Official Action for U.S. Appl. No. 13/020,505, dated Apr. 23, 2012 10 pages.
Official Action for U.S. Appl. No. 13/020,505, dated Nov. 30, 2012 10 pages.
Notice of Allowance for U.S. Appl. No. 13/020,505, dated Jul. 9, 2013 9 pages.
Official Action for U.S. Appl. No. 14/058,915, dated Jan. 13, 2016 14 pages.
Final Action for U.S. Appl. No. 14/058,915, dated Apr. 28, 2016 10 pages.
Official Action for U.S. Appl. No. 14/058,915, dated Aug. 15, 2016 9 pages.
Final Action for U.S. Appl. No. 14/058,915, dated Nov. 30, 2016 7 pages.
Office Action for U.S. Appl. No. 10/713,640 dated Jul. 28, 2006.
Office Action for U.S. Appl. No. 10/713,640, dated Dec. 31, 2007, 6 pages.
Office Action for U.S. Appl. No. 10/713,640, dated Dec. 3, 2008, 14 pages.
Office Action for U.S. Appl. No. 10/713,640 dated May 27, 2009, 5 pages.
Notice of Allowance for U.S. Appl. No. 10/713,640 dated Dec. 23, 2009, 9 pages.
Office Action for U.S. Appl. No. 11/613,056 dated Feb. 22, 2008, 25 pages.
Office Action for U.S. Appl. No. 11/613,056 dated Aug. 22, 2008, 15 pages.
Notice of Allowance for U.S. Appl. No. 11/613,056 dated Feb. 10, 2009, 12 pages.
Notice of Allowance for U.S. Appl. No. 11/613,056 dated Apr. 10, 2009, 2 pages.
Office Action for U.S. Appl. No. 12/683,967, dated Aug. 31, 2010, 6 pages.
Office Action (Restriction Requirement) for U.S. Appl. No. 12/683,967, dated Feb. 11, 2011, 6 pages.
Official Action for U.S. Appl. No. 12/683,967, dated May 19, 2011 6 pages.
Notice of Allowance for U.S. Appl. No. 12/683,967, dated Sep. 15, 2011 5 pages.
Official Action for U.S. Appl. No. 13/313,594, dated Apr. 5, 2013 5 pages Restriction Requirement.
Official Action for U.S. Appl. No. 13/313,594, dated Jun. 27, 2013 8 pages.
Notice of Allowance for U.S. Appl. No. 13/313,594, dated Nov. 26, 2013 15 pages.
Official Action for U.S. Appl. No. 13/958,683, dated Oct. 7, 2015 5 pages Restriction Requirement.
Official Action for U.S. Appl. No. 13/958,683, dated Nov. 5, 2015 11 pages.
Official Action for U.S. Appl. No. 13/958,683, dated Feb. 25, 2016 13 pages.
Official Action for U.S. Appl. No. 13/958,683, dated Jun. 20, 2016 12 pages.
Official Action for U.S. Appl. No. 13/958,683, dated Dec. 14, 2016 8 pages.
Notice of Allowance for U.S. Appl. No. 13/958,683, dated May 22, 2017 10 pages.
Corrected Notice of Allowance for U.S. Appl. No. 13/958,683, dated Jun. 20, 2017 5 pages.
Official Action for U.S. Appl. No. 15/726,091, dated Jan. 11, 2019, 9 pages.
Notice of Allowance for U.S. Appl. No. 15/726,091, dated Jun. 17, 2019, 2 pages.
Official Action for U.S. Appl. No. 13/524,907, dated Sep. 25, 2014 12 pages.
Notice of Allowance for U.S. Appl. No. 13/524,907, dated Jan. 28, 2015 8 pages.
Official Action for U.S. Appl. No. 14/287,889, dated Jun. 28, 2016 21 pages.
Final Action for U.S. Appl. No. 14/287,889, dated Nov. 8, 2016 19 pages.
Official Action for U.S. Appl. No. 14/287,889, dated Mar. 3, 2017 15 pages.
Notice of Allowance for U.S. Appl. No. 14/287,889, dated Aug. 16, 2017 11 pages.
Notice of Allowance for U.S. Appl. No. 14/287,889, dated Mar. 2, 2018 5 pages.
Notice of Allowance for U.S. Appl. No. 14/287,889, dated Jul. 20, 2018, 8 pages.
Olvera et al., "Effect of activated carbon on the thiosulfate leaching of gold," AuTec Innovative Extractive Solutions Ltd, PAPER, date unknown, 16 pages.
Olvera, Report, Catalyzed thiosulfate leaching of gold from oxide ores, AuTec, Doc. # R2019-005, Jan. 2019, pp. 1-7.
Official Action (no English translation) for Dominican Republic Patent Application No. P2013-0119, dated Oct. 23, 2019, 3 pages.
Notice of Allowance for European Patent Application No. 11846831.3, dated Nov. 11, 2019, 5 pages.
Notice of Allowance for European Patent Application No. 11846831.3, dated Apr. 17, 2020, 2 pages.
Official Action for European Patent Application No. 18155275.3, dated Apr. 16, 2020, 4 pages.
Official Action (with English translation) for Dominican Republic Patent Application No. P2013-0303, dated Jan. 29, 2020, 38 pages.
Official Action for European Patent Application No. 17193704.8, dated Mar. 5, 2020, 4 pages.
Official Action for Dominican Patent Application No. P2019-0219, dated Oct. 29, 2020, 3 pages, no translation.
U.S. Appl. No. 07/034,846, filed Mar. 4, 1998 now U.S. Pat. No. 6,251,163.
U.S. Appl. No. 09/852,699, filed May 11, 2001 now U.S. Pat. No. 6,660,059.
U.S. Appl. No. 10/446,548, filed May 27, 2003 now U.S. Pat. No. 7,066,983.
U.S. Appl. No. 10/836,480, filed Apr. 30, 2004 now U.S. Pat. No. 7,704,298.
U.S. Appl. No. 11/927,170, filed Oct. 29, 2007 now U.S. Pat. No. 7,559,974.
U.S. Appl. No. 12/700,525, filed Feb. 4, 2010 now U.S. Pat. No. 8,821,613.
U.S. Appl. No. 13/020,505, filed Feb. 3, 2011 now U.S. Pat. No. 8,597,399.
U.S. Appl. No. 14/058,915, filed Oct. 21, 2013.
U.S. Appl. No. 10/713,640, filed Nov. 13, 2003 now U.S. Pat. No. 7,722,840.
U.S. Appl. No. 11/613,056, filed Dec. 19, 2006 now U.S. Pat. No. 7,544,232.
U.S. Appl. No. 12/683,967, filed Jan. 7, 2010 now U.S. Pat. No. 8,097,227.
U.S. Appl. No. 13/313,594, filed Dec. 7, 2011 now U.S. Pat. No. 8,715,389.
U.S. Appl. No. 13/958,683, filed Aug. 5, 2013 now U.S. Pat. No. 9,790,572.
U.S. Appl. No. 15/726,091, filed Oct. 6, 2017 now U.S. Pat. No. 10,415,116.
U.S. Appl. No. 13/524,907, filed Jun. 15, 2012 now U.S. Pat. No. 9,051,625.
U.S. Appl. No. 14/287,889, filed May 27, 2014 now U.S. Pat. No. 10,597,752.
U.S. Appl. No. 15/729,961, filed Oct. 11, 2017 now U.S. Pat. No. 10,597,752.
U.S. Appl. No. 16/748,523, filed Jan. 21, 2020.
International Search Report and Written Opinion for International (PCT) Patent Application No. PCT/IB2020/000795, dated Jan. 5, 2021 14 pages.
Official Action for Argentina Patent Application No. 20150100385, dated Aug. 8, 2020 4 pages.
Official Action for European Patent Application No. 18155275.3, dated Sep. 16, 2020, 4 pages.

(56) References Cited

OTHER PUBLICATIONS

Official Action for U.S. Appl. No. 15/729,961, dated Jul. 3, 2019 9 pages.
Notice of Allowance for U.S. Appl. No. 15/729,961, dated Oct. 28, 2019, 8 pages.
Official Action (with English translation) for Japanese Patent Application No. 2019-079274, dated Jul. 1, 2020, 4 pages.
Administrative Instructions for Third Party Observation for International (PCT) Patent Application No. PCT/IB2020/000795, dated Apr. 30, 2021 4 pages.
Official Action for European Patent Application No. 18155275.3, dated May 20, 2021, 4 pages.
Official Action for Dominican Patent Application No. P2019-0219, dated May 4, 2021, 2 pages, no translation.
Third Party Observation for European Patent Application No. 20835636.0, dated Jul. 27, 2021 2 pages.
International Report on Preliminary Patentability for International (PCT) Patent Application No. PCT/IB2020/000795, dated Jul. 29, 2021 8 pages.
Official Action (no translation) for Dominican Patent Application No. P2019-0219, dated Dec. 14, 2021, 6 pages.
Official Action (with English translation) for Japanese Patent Application No. 2019-079274, dated Nov. 2, 2021, 3 pages.
Official Action (no translation) for Peruvian Patent Application No. 2391-2017, dated Jan. 5, 2022, 7 pages.
Notification of Acceptance (English translation) for Peruvian Patent Application No. South Africa 2015/08697, dated Jan. 7, 2022, 1 page.
Third-Party Submission for U.S. Appl. No. 16/748,523, dated Apr. 28, 2021 12 pages.
Notice of Allowance for European Patent Application No. 18155275.3, dated Feb. 11, 2022, 7 pages.
Official Action (with English translation) for Brazilian Patent Application No. BR112015029585-1, received Jan. 11, 2022 7 pages.
Official Action for U.S. Appl. No. 16/748,523, dated Mar. 3, 2022 23 pages.
Notice of Allowance (with English translation) for Japanese Patent Application No. 2019-079274, dated Feb. 15, 2022, 6 pages.

* cited by examiner

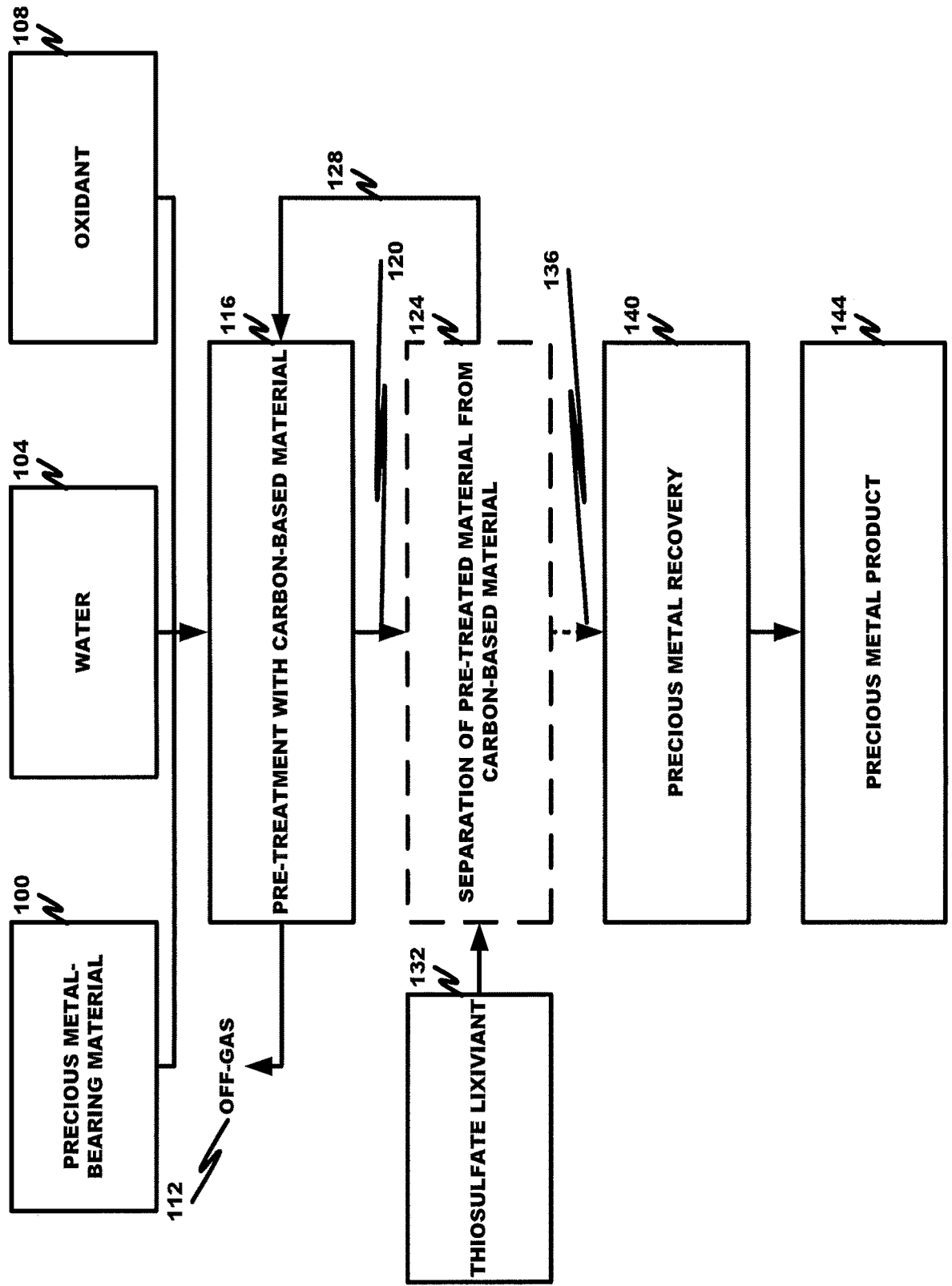

METHOD FOR PRE-TREATMENT OF GOLD-BEARING OXIDE ORES

CROSS REFERENCE TO RELATED APPLICATIONS

The present application is a continuation application of U.S. application Ser. No. 15/729,961 filed Oct. 11, 2017, now issued as U.S. Pat. No. 10,597,752, which is a continuation of U.S. application Ser. No. 14/287,889 with a filing date of May 27, 2014, now issued as U.S. Pat. No. 10,161,016, which claims the benefits of U.S. Provisional Application Ser. No. 61/828,558, filed May 29, 2013, each entitled "Method for Pre-Treatment of Gold-Bearing Oxide Ores", each of which is incorporated herein by this reference in its entirety.

FIELD

The disclosure relates generally to precious metal recovery from precious metal-containing materials and particularly to gold recovery from gold-containing materials.

BACKGROUND

The conventional cyanidation/carbon in pulp process has been the main gold extraction method for decades. While cyanidation is effective for leaching gold from some carbonaceous or complex ores, there are serious environmental concerns associated with the use of cyanide in gold leaching processes. Thiosulfate is among the more successful alternative lixiviants for effective leaching of gold. An example of a thiosulfate leaching process for precious metal-containing materials is shown in U.S. Pat. No. 7,544,232.

Some oxide ores may be refractory in nature. They neither yield sufficient gold leaching in a thiosulfate leach system nor are leached as effectively compared to cyanide. Thiosulfate gold extraction from some oxide ores can be minimal. As oxide ores do not contain sulfides (or have very low levels of sulfide), the refractory nature cannot be mitigated in the same manner as for sulfide ores (e.g., by roasting, bio-oxidation or pressure oxidation).

There is a need for a thiosulfate leaching method to address the refractory nature of certain oxide ores in the thiosulfate leach system.

SUMMARY

These and other needs are addressed by the various aspects, embodiments, and configurations of the present disclosure. The disclosure is directed generally to pre-treatment of precious metal-containing materials prior to thiosulfate precious metal leaching.

A pre-treatment process can include the steps of:

(a) contacting a precious metal-containing material with carbon and an oxidant (e.g., a molecular oxygen-containing gas) to form a pre-treated slurry;

(b) optionally removing the carbon from the pre-treated slurry to form a carbon-depleted slurry (e.g., having substantially less carbon than the pre-treated slurry); and (c) contacting the pre-treated slurry or carbon-depleted slurry with thiosulfate to leach a precious metal from the pre-treated precious metal-containing material.

The precious metal, for example, can be gold.

Whether or not carbon is removed depends on the particle size of the carbon employed. When coarse carbon is employed, the carbon is typically removed before thiosulfate leaching. When fine carbon is employed, the carbon is typically not removed before thiosulfate leaching.

Finely sized carbon can be contacted with the precious metal-containing material either separately after grinding of the material or before and/or during grinding. In the latter case, the carbon particles can be coarsely sized but are ground to a fine size distribution similar to a size distribution of the ground precious metal-containing material.

Prior to leaching in step (c), the precious metal-containing material can be substantially free of contact with thiosulfate. Stated differently, the slurried precious metal-containing material, before and during step (a), typically includes less than 0.005, more typically no more than about 0.0025, and even more typically no more than about 0.001 molar thiosulfate. In some applications, no thiosulfate or other lixiviant is contacted with the precious metal-containing material before or during pre-treatment in step (a).

The precious metal-containing material can be amenable to cyanide leaching (and therefore is not cyanide refractory) but not to thiosulfate leaching (i.e., the material is a thiosulfate refractory precious metal-containing material). In other words, leaching of precious metals from the precious metal-containing material by cyanide can be more effective than precious metal leaching by thiosulfate. Even when leaching of the precious metal-containing material has similar precious metal recoveries using either cyanide or thiosulfate as the lixiviant, the pretreatment process can enhance further precious metal recovery by thiosulfate. The precious metal-containing material may or may not be concentrated. Generally, the precious metal is in a matrix that is predominantly one or more oxides. By way of example, the precious metal-containing material can contain more oxides than sulfides.

The slurry before pretreatment and the pre-treated slurry can each have a pH about pH 3 or higher (and, in some cases, about pH 7 or higher); an oxidation-reduction potential during pretreatment ranging from about 100 to about 600 mV (Ag/AgCl electrode); and/or a rate of contact of a molecular oxygen-containing gas with the slurry during pretreatment of about 0.10 L $O_2$/L slurry/min or higher.

Generally, a weight ratio of the precious metal-bearing material to carbon ranges from about 50:1 to about 1:0.01 but the amount of carbon employed in any application can depend on the carbon particle size. A weight ratio of the precious metal-bearing material to coarsely sized carbon commonly ranges from about 1:5 to about 1:0.01 and more commonly from about 1:3 to about 1:0.5. A weight ratio of the precious metal-bearing material to finely sized carbon commonly ranges from about 1:1 to about 50:1 and more commonly from about 10:1 to about 30:1.

The pre-treatment process can be carried out under ambient conditions (room temperature and atmospheric pressure) in less than 24 hours. Increasing the process temperature can further improve the gold recovery and/or pretreatment kinetics.

The carbon is normally removed from the pre-treated slurry by screening, which generally requires about 95% or more, and even more commonly about 98% or more of the carbon to be retained on the screen while about 90% or more and more commonly about 95% or more of the precious metal-containing material passes through the screen. The relative mean, median, mode, and $P_{80}$ particle sizes of the carbon and precious metal-containing material are selected to produce at least these levels of separation.

After carbon separation, the discharge slurry from the pre-treatment process, can be directly advanced to thiosulfate leaching. The carbon-depleted slurry can be contacted with thiosulfate in the substantial absence of pH adjustment and/or slurry density adjustment. As an example, a pH of the carbon-depleted slurry is commonly adjusted by no more than about pH 0.1 and the slurry density by no more than about 5%.

The present disclosure can provide a number of advantages depending on the particular configuration. Pre-treating oxide ores in oxygenated water in the presence of activated carbon or other carbon-based materials can improve significantly the gold recovery by thiosulfate leaching. The process can have a low operating cost and provide a straightforward pre-treatment method for oxide ores to be followed by thiosulfate leaching of gold. Attrition, due to mixing of the slurry, is commonly the only cause for carbon loss and may be minimized by proper engineering of the agitators and reactors. The carbon-based material can be recycled and re-used, thereby decreasing operating costs. Inexpensive air (or more expensive oxygen gas) are the only reagents consumed, thereby making the economics of the process very attractive.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "activated carbon" is a form of carbon processed to be riddled with small, low-volume pores that increase the surface area available for adsorption or chemical reactions. Activated carbon can be granular, extruded, bead, impregnated, and/or polymer coated.

The term "carbon" includes a carbon-containing organic material, such as one or more of activated carbon (or activated charcoal or activated coal), coal (e.g., peat, lignite, sub-bituminous coal, bituminous coal, steam coal, anthracite, and graphite), brown coal, coke, hard carbon derived from coconut shells or elemental carbon, a calcined resin, and mixtures thereof.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "precious metal" refers to gold and silver.

A "thiosulfate refractory" precious metal-containing material is a material in which at least part of the precious metal-containing material is naturally resistant to recovery by thiosulfate leaching. The recovery of thiosulfate refractory ores can be increased by pretreatment prior to thiosulfate leaching, or by employing cyanide leaching.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawing is incorporated into and forms a part of the specification to illustrate several examples of the present disclosure. This drawing, together with the description, explains the principles of the disclosure. The drawing simply illustrates preferred and alternative examples of how the disclosure can be made and used and is not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 1 is a process flow schematic according to an embodiment of the disclosure.

DETAILED DESCRIPTION

Overview

The present disclosure provides a process for pre-treating precious metal-bearing materials. The process can be performed prior to thiosulfate leaching and improve the overall precious metal recovery of thiosulfate refractory precious metal-containing materials. The pre-treatment is done by mixing a slurry containing the precious metal-containing material, water, a carbon-based material, and dissolved molecular oxygen (as the oxidizing reagent) for a predetermined residence time.

The precious metal-bearing material can be an oxide ore, concentrate, tailings, leach residue, calcine, and other precious metal-bearing oxide materials. Typical precious metal-bearing oxide ores and concentrates may contain silicates, phosphates, iron oxides, and hydroxides, and relatively low levels of residual sulfides.

In the pre-treatment process, the precious metal-bearing material is mixed, in a stirred tank, vat, or other suitable reactor, with the carbon-based material, such as activated carbon, and water to form the slurry. Molecular oxygen is typically contacted by sparging the slurry. The molecular oxygen can be supplied by a suitable source, such as air, oxygen-enriched air, or industrially-pure oxygen, with ambient air being preferred. The process can be carried out in any water source, whether raw water or relatively clean process water. Other suitable reactors, such as pulse columns, can be any reactor able to adequately mix carbon, the slurried precious metal-containing material, and gas.

Proper reaction conditions can provide relatively high kinetics. Typically, the pre-treatment process is conducted at atmospheric pressure and temperature, though the use of a higher operating temperature (e.g., typically about 35° C. or higher and more typically about 50° C. or higher) can provide improved reaction kinetics. The pH of the slurry is typically about pH 7 or higher, more typically about pH 8 or higher, and even more typically about pH 9 or higher. The oxidation-reduction potential ("ORP") of the slurry is typically greater than about 100 mV and more typically greater than about 200 mV and typically less than about 750 mV and more typically less than about 500 mV (Ag/AgCl electrode). The rate of sparging of molecular oxygen through the slurry during pre-treatment typically ranges from about 0.05 to about 5 and more typically from about 0.10 to about 2.5 L $O_2$/L slurry/min. The residence time of the slurry in the mixing vessel typically ranges from more than about 1 hour to about 24 hours, depending on the temperature, dissolved oxygen concentration in solution, and the ore type. Ultimately, the pre-treatment conditions, particularly time and temperature of the pretreatment process, carbon-based material dosage, and rate of oxygen addition, are adjusted to optimize precious metal recovery.

The weight ratio of the carbon-based material to the precious metal-bearing material can vary depending on the requirements of the specific ore, the properties of the carbon-based material itself, and the desired level of precious metal recovery. Typically, for coarsely sized carbon the weight ratio of the precious metal-bearing material to the carbon-based material ranges from about 1:3 to about 1:0.01 and more typically from about 1:3 to about 1:0.1. A more typical weight ratio of the precious metal-containing material to the coarsely sized carbon-based material is about 1:0.5. Typically, for finely sized carbon the weight ratio of the precious metal-bearing material to the carbon-based material commonly ranges from about 1:1 to about 50:1 and more commonly from about 10:1 to about 30:1. A more typical weight ratio of the precious metal-containing material to the finely sized carbon-based material is about 20:1. The carbon-based material is generally not consumed in the pre-treatment process and can be recycled and re-used, with make-up for carbon attrition. Oxygen gas is commonly the only reagent consumed though any other oxidant, including ozone and a peroxygen compound such as hydrogen peroxide, may be employed.

The process can be carried out batch-wise or continuously, the latter being preferred.

After pre-treatment is completed, the carbon-based material can be separated by a suitable technique from the pre-treated precious metal-bearing material in the pre-treated slurry. Separation is generally done in applications using coarsely sized carbon particles but not finely sized carbon particles. Coarsely sized carbon particle separation may be done using differences in particle size. To make this effective, a considerable particle size difference between the coarsely sized particles of the carbon-based material and the more finely sized particles of the precious metal-containing material is normally required. Regardless of the separation technique employed, the coarsely sized carbon-based material may be recycled many times to the pre-treatment process.

Unlike operations using coarsely sized carbon particles, operations using finely sized carbon particles generally do not separate the carbon particles from the particles of the pre-treated precious metal-containing material. After precious metal recovery, the finely sized carbon particles are sent to tailings along with the precious metal barren material.

The pre-treated slurry can then be fed directly to the thiosulfate leaching process. No filtration of the slurry before thiosulfate leaching is generally required. Depending on the ore type, the pre-treated slurry commonly has pH greater than about pH 3, more commonly greater than about pH 7, and even more commonly greater than about pH 8. In some cases, no pH adjustment is required before the pre-treated slurry is contacted with the thiosulfate lixiviant to commence leaching. As will be appreciated, thiosulfate leaching is generally performed at a pH of between about pH 7.5 and pH 10.

The method of the present invention is particularly suitable for pre-treatment of gold-bearing oxide ores and concentrates, prior to thiosulfate leaching, to improve the gold recovery of the thiosulfate leaching process. Direct thiosulfate leaching of some gold-bearing ores can result in poor gold recovery, and pre-treatment before the leaching process can provide a substantial increase in gold recovery.

Exemplary Precious Metal Pre-Treatment and Recovery Process

FIG. 1 is an exemplary schematic flow diagram depicting the unit operations of gold-bearing oxide ore pre-treatment prior to thiosulfate leaching. The process generally pre-treats the gold-bearing ore with a carbon-based material (e.g., activated carbon) in oxygenated-water, optionally removes the carbon-based material after pre-treatment, and feeds the pre-treated slurry directly to the thiosulfate leaching process. While discussed with reference to gold-bearing oxide ores, the process can be applied to any type of precious metal-bearing material.

Referring to FIG. 1, the precious metal-bearing material 100 is mixed, in step 116, with water 104 in the mixer unit (not shown) to form a slurry to be pre-treated. Although no pH adjustment is generally required, the need for pH adjustment depends on the material's composition and the ratio of the material, water and carbon in the slurry. The pH can increase during pretreatment. The initial pH can be acidic or basic, depending on the application. For example, the initial pH commonly ranges from about pH 3 to about pH 9. An increase in pH typically to a final pH of about pH 7 to about pH 10 and more typically of about pH 7 to about pH 9, has been observed, which can allow the thiosulfate leaching to proceed without any (or in the absence of) pH adjustment prior to contact of the thiosulfate lixiviant 132 with the pre-treated precious metal-bearing material.

In step 116, fresh and/or recycled carbon-based material 128 and an oxidant 198 (e.g., molecular oxygen/air or enriched air) are contacted with the slurry in the mixer unit. The mixer commonly mixes the various slurry constituents at the ambient temperature and atmospheric pressure in an oxygenated condition. The oxidant 108 can be supplied by the use of air, oxygen-enriched air, or pure oxygen and the non-reacted portion of the oxidant gas may be vented as off-gas 112. The residence time of the slurry in the mixer unit depends on the material type and can range from about 1 hr to about 24 hrs.

In one configuration, the carbon-based material is comminuted with the precious metal-bearing material before pretreatment. In that event, a size distribution of the comminuted precious metal-bearing material can be substantially the same as the size distribution of the comminuted carbon.

In optional step 124, most, or all, of the coarsely sized carbon-based material is removed from (e.g., screened out of) the pre-treated slurry 120 to form a carbon-based material-depleted slurry 136. As noted, removing the coarsely sized carbon-based material by screening in the carbon-based material screen unit (not shown) is particularly effective where there is a considerable size difference between the coarsely sized carbon-based material and other solid phases in the pre-treated slurry 120. Screening can typically remove 95% or more of the coarsely sized carbon from the pre-treated slurry. The screened coarsely sized carbon-based material 128 may be directly recycled back to the pre-treatment step 116 and introduced into the mixer unit, typically without requiring further washing or processing. Acid or basic washing can be performed if required or desired.

The carbon-based material depleted slurry 136 or pre-treated slurry 120, as the case may be, is advanced to precious metal recovery step 140 in which the slurry 136 or 120 is contacted with a thiosulfate lixiviant to leach or dissolve most of the precious metal from the precious metal-bearing material. Dissolved precious metals can be recovered by known techniques, such as resin-in-leach, cementation, precipitation, electrolysis, carbon adsorption, and the like, to form a precious metal product 144.

The pulp density of solids (including the precious metal-bearing material and carbon-based material) in the mixer unit may be designed to achieve the required solid pulp density for thiosulfate leaching with or without the removal of the carbon-based material 128. The carbon-based material-depleted slurry 136 can then be fed directly to thiosulfate leaching, without any filtration or water addition being necessary.

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

Example 1

Baseline Gold Recovery with Thiosulfate and Cyanide Leaching

Three different gold-containing oxide ore samples ($P_{80}$ of 80 μm), were leached with thiosulfate. The leaching was conducted at pH 8, adjusted with calcium hydroxide, for 24 hours at 50° C. using 0.1M calcium thiosulfate, 50 ppm Cu, 0.5-1 L/min air and 20 mL/L resin. No pre-treatment was carried out on the samples.

A second set of the samples were leached using the cyanide carbon-in-leach pretreatment process. Table 2 summarizes the composition of the ores and the gold recovery results by thiosulfate leaching on each sample. The gold recovery of samples A and B is very low and gold recovery from sample C is approximately 71%.

As shown in Table 1, the ores are fairly similar in nature, and besides, oxygen and silicon contain other compounds:

TABLE 1

| Element | Units | Sample A | Sample B | Sample C |
|---|---|---|---|---|
| Gold | g/t | 17.86 | 4.75 | 7.45 |
| Calcium | Wt. % | 0.279 | 0.922 | 8.413 |
| Magnesium | Wt. % | 0.039 | 0.043 | 1.559 |
| Iron | Wt. % | 1.719 | 0.842 | 0.965 |
| Total Oxides | Wt. % | >95 | >95 | >95 |
| Total Carbon | Wt. % | <2 | <2 | <2 |

Table 2 shows the gold recovery by thiosulfate leaching and cyanidation.

TABLE 2

| Gold Leaching Method | Sample A % Recovery | Sample B % Recovery | Sample C % Recovery |
|---|---|---|---|
| Thiosulfate Leaching | 22.7 | 26.4 | 70.7 |
| Cyanide Leaching | 92.2 | 73.4 | 69.3 |

As is demonstrated above, gold recovery by thiosulfate is in some cases significantly lower than that achieved by cyanidation.

Example 2

The Effect of Carbon Pretreatment on Gold Recovery by Thiosulfate Leaching

The same three oxide ore samples from Example 1 were pre-treated with activated carbon in oxygenated water at atmospheric temperature and pressure for 24 hrs. The weight ratio of ore to activated carbon was 2:1 in all three of the tests. Overall solid pulp density (inclusive of ore and activated carbon) of the slurry in the pre-treatment process was about 45%, which resulted, after carbon separation, in solid pulp density of 35% in ore-water slurry. The required oxygen gas was supplied by sparging the slurry via industrially-pure oxygen gas with the sparging rate of 0.5 L $O_2$/L slurry/min. The oxidation-reduction potential ("ORP") of the slurry during pre-treatment was greater than about 100 mV and less than about 500 mV Ag/AgCl. As will be appreciated, the ORP employed depends on the type of ore and the slurry makeup.

The activated carbon was screened out from the pretreated slurry, and the slurries leached with thiosulfate as described in Example 1. The gold recovery results of the leaching process are presented below in Table 3:

TABLE 3

| Gold Leaching Method | Sample A % Recovery | Sample B % Recovery | Sample C % Recovery |
| --- | --- | --- | --- |
| Thiosulfate Leaching | 22.7 | 26.4 | 70.7 |
| Carbon Pretreatment and Thiosulfate Leaching | 86.2 | 71.1 | 80.2 |
| Cyanide Leaching | 92.2 | 73.4 | 69.3 |

All three samples show a significant increase in gold recovery by thiosulfate leaching, after use of the carbon pretreatment process. Sample A does not achieve the recovery observed with cyanide leaching. Sample B shows a recovery similar to cyanide leaching. Sample C shows a better recovery than with cyanide leaching Example 3

Pretreatment with Oxygen Only

The same tests of Example 2 were repeated on the same ores, however, no carbon was added to the pre-treatment process (i.e., ore was mixed in oxygenated water). The final gold recovery from the samples was very similar to those of Example 1. In other words, pre-treatment without the carbon-based material has no beneficial effect on gold recovery by thiosulfate leaching.

Example 4

Pretreatment Duration

Sample B of Example 2 was pre-treated and leached with the identical processes to those of Example 2, except the pre-treatment was conducted for 6 hrs, instead of 24 hrs. Decreasing the pre-treatment duration from 24 hours to 6 hrs decreased the gold recovery from 71.1% to 60.7%.

Example 5

Affect of Oxygen Concentration

Various oxygen containing gases, such as pure oxygen gas, air or oxygen-enriched air, may be used for oxygenating. Ore sample A was pretreated in the same manner described in Example 2 with the exception that oxygen was supplied as (i) pure oxygen gas, and (ii) air. Following pretreatment, thiosulfate leaching was performed as described in Example 1. The gold recovery was 86.2% when the pretreatment was performed with oxygen and 81.4% when it performed with air.

Example 6

Effect of Pretreatment Temperature

Two samples of gold-bearing oxide ore (>95% oxides, <1% Fe, <2% carbon, and 18.5 ppm Au) were pre-treated with activated carbon in oxygenated water at atmospheric pressure for 24 hrs. The weight ratio of ore to activated carbon was 2:1 in all three of the tests. Overall solid pulp density (inclusive of ore and activated carbon) of the pre-treatment process was about 45%, which resulted in solid pulp density of 35% in ore-water slurry, after carbon separation. One sample was pre-treated at 25° C., and the other at 50° C. The obtained gold recoveries after pre-treatment at 25 and 50° C. were 80.8% and 82.2%, respectively. Gold recovery from the ore, without pre-treatment (i.e., direct thiosulfate leaching of the ore), was only 44.7%.

Example 6

Effect of Carbon Particulate Size

A series of test were conducted on the same ore sample. A baseline test using standard carbon in leach (CIL) cyanidation techniques yielded a gold extraction of 90.1%. Leaching of the same ore using thiosulfate solution (0.1M calcium thiosulfate, 50 ppm Cu, 0.5-1 L/min air and 20 cc/L resin, pH adjusted with calcium hydroxide) yielded a 57.4% gold recovery after twenty four hours leaching.

In tests three through six, the sample was pretreated in 1 litre of water for 6 hours in the presence of coarse activated carbon and/or finely ground activated carbon. The coarse activated carbon was separated from the ore prior to thiosulfate leaching, while the finely ground carbon remained with the ore during leaching. All carbon addition regimens increase the thiosulfate gold extraction above the baseline of 57.4%. The greatest improvement of gold extraction occurs when the ore is pretreated with coarse activated carbon at an ore to carbon ratio of 2:1 (82.9%). High gold extraction (81.8%) also occurs when the sample is pretreated with finely ground carbon at an ore to carbon ratio of 20:1. This indicates that when finely ground carbon is added, a smaller amount of carbon is required to improve the gold recovery. Fine carbon can be added separately or inter-ground with the ore.

TABLE 4

| Test # | Test Description | % Gold Extraction |
| --- | --- | --- |
| 1 | CIL cyanide leaching | 90.1 |
| 2 | Thiosulfate leaching | 57.4 |
| 3 | Pretreatment of 150 g ore with 75 g coarse activated carbon, followed by thiosulfate leaching | 82.9 |
| 4 | Pretreatment of 150 g ore with 1.5 g ground activated carbon, followed by thiosulfate leaching | 75.6 |
| 5 | Pretreatment of 150 g ore with 7.5 g ground activated carbon, followed by thiosulfate leaching | 81.8 |
| 6 | Pretreatment of 150 g ore with 15 g ground activated carbon, followed by thiosulfate leaching | 79.0 |

A number of variations and modifications of the disclosure can be used. It would be possible to provide for some features of the disclosure without providing others.

For example, while coarsely sized carbon is preferred to avoid the need to continuously add carbon into the slurry and to allow carbon recycle in a continuous mode of operation, finely sized carbon may be used. When using fine carbon, the carbon can not only be introduced in the pretreatment stage but also added into the grinding stage to grind the precious metal-bearing feed material and carbon together to form a combined precious metal-containing and carbon-containing feed to the pretreatment stage. Using fine carbon in this way can reduce the amount of carbon consumed to less than 1 part carbon and 2 parts precious metal-containing feed material. The oxidant can be added during grinding or thereafter to effect pretreatment.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process, comprising:
   a) providing a particulate carbon comprising one or more of activated carbon, activated charcoal, coke, hard carbon derived from at least one of coconut shells and elemental carbon, a calcined resin, and mixtures thereof;
   b) providing a precious metal-containing material having a first precious metal thiosulfate leaching value in the absence of prior contact with the particulate carbon;
   c) contacting the precious metal-containing material with the particulate carbon and an oxidant to form a pre-treated slurry comprising a pre-treated precious metal-containing material and the particulate carbon; and
   d) contacting the pre-treated slurry with thiosulfate to leach a precious metal from the pre-treated precious metal-containing material to form a precious metal-pregnant thiosulfate leach solution and a precious metal-barren material, wherein the pre-treated precious metal-containing material has a second precious metal thiosulfate leaching value after the contacting step c) that is more than the first precious metal thiosulfate leaching value.

2. The process of claim 1, wherein, in step c), the precious metal-containing material is free of contact with thiosulfate.

3. The process of claim 1, wherein the precious metal-containing material contains more oxides than sulfides and wherein the precious metal-containing material is refractory to thiosulfate leaching.

4. The process of claim 1, wherein the precious metal-containing material is an oxide ore that is not cyanide refractory.

5. The process of claim 1, wherein the oxidant is molecular oxygen, wherein the precious metal-containing material before step c) has an initial pH of at least pH 3, wherein the pre-treated slurry has a pH of from about pH 7 to about pH 10, wherein an oxidation-reduction potential during step c) ranges from about 100 to about 750 mV (Ag/AgCl electrode), and wherein a rate of contact of molecular oxygen with the slurry during step c) is at least 0.10 L $O_2$/L slurry/min.

6. The process of claim 1, wherein a weight ratio of the precious metal-bearing material to the particulate carbon ranges from about 50:1 to about 1:0.01 and wherein after recovering the precious metal from a precious metal-pregnant leach solution, the particulate carbon is sent to tailings along with the precious metal-barren material.

7. The process of claim 1, wherein the pre-treated slurry is contacted with thiosulfate in the absence of a pH adjustment and/or a slurry density adjustment.

8. The process of claim 1 further comprising removing the particulate carbon from the pre-treated slurry, wherein the precious metal-containing material has an average precious metal-containing material particle size, wherein the particulate carbon has an average carbon particle size, and wherein the average carbon particle size is more than the average precious metal-containing material particle size and wherein the particulate carbon is removed from the pre-treated slurry by screening.

9. A process, comprising:
   a) contacting a gold-containing material with particulate carbon and an oxidant, the particulate carbon comprising one or more of activated carbon, activated charcoal, coke, hard carbon derived from at least one of coconut shells and elemental carbon, a calcined resin, and mixtures thereof, to form a pre-treated slurry comprising a pretreated gold-containing material and the particulate carbon;
   b) leaching the pre-treated slurry with thiosulfate to dissolve gold in the pre-treated slurry and form a gold pregnant thiosulfate leach solution and a gold-barren material; and
   c) recovering dissolved gold from the gold pregnant leach solution by one or more of resin-in-leach, cementation, precipitation, and electrolysis.

10. The process of claim 9 further comprising removing the particulate carbon from the pre-treated slurry, wherein the precious metal-containing material has an average precious metal-containing material particle size, wherein the particulate carbon has an average carbon particle size, and wherein the average carbon particle size is more than the average precious metal-containing material particle size and wherein the particulate carbon is removed from the pre-treated slurry by screening.

11. The process of claim 9, wherein, in step a), the gold-containing material is free of contact with thiosulfate.

12. The process of claim 9, wherein the gold-containing material contains more oxides than sulfides and wherein a gold recovery by thiosulfate leaching of the gold-containing material in the absence of prior contact with the carbon is less than a gold recovery by thiosulfate leaching of the gold-containing material after prior contact with the carbon.

13. The process of claim 9, wherein the gold-containing material is an oxide ore that is not cyanide refractory, wherein the carbon-depleted slurry has a greater gold thiosulfate leaching value than at least part of the gold-containing material, and wherein at least part of the gold-containing material is refractory to recovery of the gold by thiosulfate leaching.

14. The process of claim 9, wherein the oxidant is molecular oxygen, wherein the gold-containing material before step a) has a pH at least pH 3, wherein, during step a), the slurry has a pH of from about pH 7 to about pH 10, wherein, during step a), the slurry has an oxidation-reduction potential ranging from about 100 to about 750 mV (Ag/AgCl electrode), and wherein a rate of contact of molecular oxygen with the slurry during step a) is at least 0.10 L $O_2$/L slurry/min.

15. The process of claim 9, wherein a weight ratio of the gold-bearing material to carbon ranges from about 50:1 to about 1:0.01 and wherein after recovering dissolved gold from the gold pregnant leach solution, the particulate carbon is sent to tailings along with the gold-barren material.

16. The process of claim 9, wherein the pre-treated slurry is contacted with thiosulfate in the absence of a pH adjustment and/or a slurry density adjustment.

17. The process of claim 16, wherein a pH of the pre-treated slurry is adjusted by no more than pH 0.1 and a slurry density is adjusted by no more than 5%.

18. A process, comprising:
a) contacting a gold-containing material with carbon and an oxidant to form a pre-treated slurry, the carbon comprising one or more of activated carbon, activated charcoal, coke, hard carbon derived from at least one of coconut shells and elemental carbon, a calcined resin, and mixtures thereof; and
b) contacting the pre-treated slurry with thiosulfate to leach gold from the pre-treated slurry, wherein:
in step a), the pre-treated slurry comprises less than 0.005 molar thiosulfate;
the gold-containing material contains more oxides than sulfides;
the gold-containing material comprises an oxide ore that is not cyanide refractory;
a gold recovery by thiosulfate leaching of the pre-treated slurry is greater than a gold recovery by thiosulfate leaching of the gold-containing material in the absence of prior contact with the carbon;
the oxidant is molecular oxygen;
the gold-containing material before step a) has a pH at least pH 3;
during step a), the gold-containing material has a pH of from about pH 7 to about pH 10;
during step a), the gold-containing material has an oxidation-reduction potential ranging from about 100 to about 750 mV (Ag/AgCl electrode);
a rate of contact of molecular oxygen with the slurry during step a) is at least 0.10 L $O_2$/L slurry/min; and
a weight ratio of the gold-bearing material to carbon ranges from about 1:3 to about 1:0.01.

19. The process of claim 18, wherein the pre-treated slurry is contacted with the thiosulfate in the absence of a pH adjustment and/or a slurry density adjustment and wherein at least part of the gold-containing material is refractory to recovery of gold by thiosulfate leaching.

20. The process of claim 18 further comprising removing at least about 95% of the carbon from the pre-treated slurry prior to step b), wherein the carbon is removed from the pre-treated slurry by screening.

* * * * *